US012634966B2

(12) United States Patent
Elshafie et al.

(10) Patent No.: US 12,634,966 B2
(45) Date of Patent: May 19, 2026

(54) EXPLOITING UNUTILIZED TRANSMISSION OCCASIONS

(71) Applicant: QUALCOMM Incorporated, San Diego, CA (US)

(72) Inventors: Ahmed Elshafie, San Diego, CA (US); Marwen Zorgui, San Diego, CA (US); Ahmed Attia Abotabl, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 18/357,777

(22) Filed: Jul. 24, 2023

(65) Prior Publication Data

US 2025/0039908 A1      Jan. 30, 2025

(51) Int. Cl.
*H04W 72/40*        (2023.01)
*H04L 1/08*        (2006.01)
*H04W 72/1263*        (2023.01)

(52) U.S. Cl.
CPC .............. *H04W 72/40* (2023.01); *H04L 1/08* (2013.01); *H04W 72/1263* (2013.01)

(58) Field of Classification Search
CPC . H04W 72/40; H04W 72/1263; H04W 72/02; H04W 28/22; H04W 4/40; H04W 72/14; H04W 72/23; H04W 72/53; H04W 92/18; H04L 1/08; H04L 1/1896; H04L 1/1893; H04L 2001/0097
See application file for complete search history.

(56) References Cited

U.S. PATENT DOCUMENTS

| | | | | |
|---|---|---|---|---|
| 2021/0144750 A1* | 5/2021 | Cao | ................... | H04W 72/0453 |
| 2022/0078753 A1* | 3/2022 | Park | ...................... | H04W 28/02 |
| 2022/0150872 A1* | 5/2022 | Park | .......................... | H04L 1/08 |
| 2022/0174682 A1* | 6/2022 | Li | .......................... | H04W 76/23 |
| 2022/0232627 A1 | 7/2022 | Lee et al. | | |
| 2022/0272679 A1 | 8/2022 | Wang et al. | | |
| 2023/0040421 A1* | 2/2023 | Tsai | .................... | H04W 72/115 |
| 2023/0262718 A1* | 8/2023 | Hui | ....................... | H04W 72/02 370/329 |
| 2024/0113815 A1* | 4/2024 | Yu | .......................... | H04L 1/1854 |
| 2024/0381384 A1* | 11/2024 | Selvanesan | ........... | H04W 72/25 |

FOREIGN PATENT DOCUMENTS

WO        2023132982        7/2023

OTHER PUBLICATIONS

International Search Report and Written Opinion—PCT/US2024/037469—ISA/EPO—Oct. 17, 2024.

* cited by examiner

*Primary Examiner* — Rushil P. Sampat
(74) *Attorney, Agent, or Firm* — QUALCOMM Incorporated

(57) ABSTRACT

Certain aspects of the present disclosure provide techniques for enhancing resource utilization. An example method, performed at a first user equipment (UE), includes receiving sidelink configuration information configuring the first UE with at least initial transmission occasions for initial sidelink transmissions using shared sidelink resources and transmitting a first indication, to at least a second UE that uses the shared sidelink resources, of at least one probability that the first UE will skip at least one of the initial transmission occasions or one or more retransmission occasions scheduled for retransmission of an initial transmission.

24 Claims, 15 Drawing Sheets

600A

Option 1: Orthogonal resources

600B

Option 2: MU MIMO

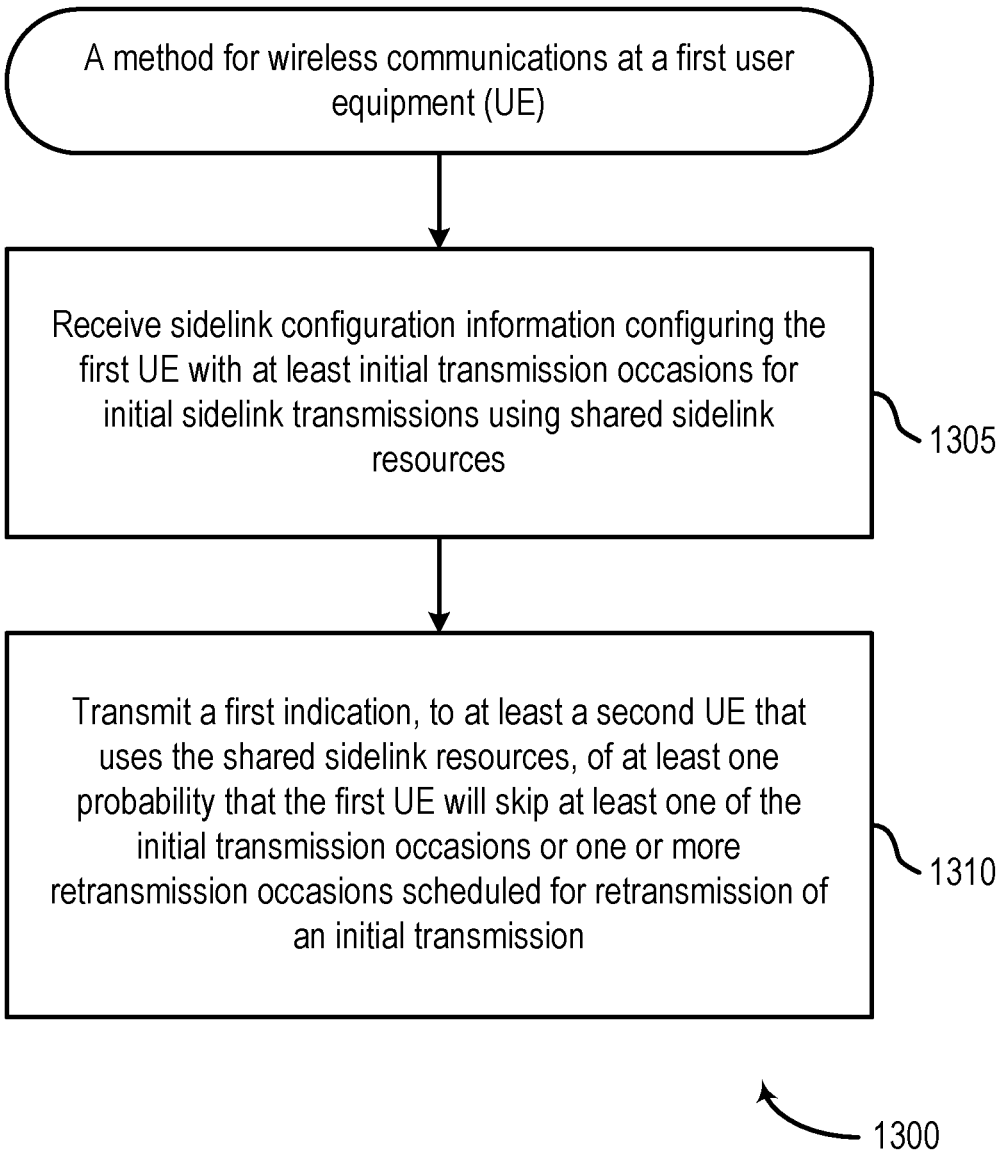

A method for wireless communications at a first user equipment (UE)

Receive sidelink configuration information configuring the first UE with at least initial transmission occasions for initial sidelink transmissions using shared sidelink resources

1305

Transmit a first indication, to at least a second UE that uses the shared sidelink resources, of at least one probability that the first UE will skip at least one of the initial transmission occasions or one or more retransmission occasions scheduled for retransmission of an initial transmission

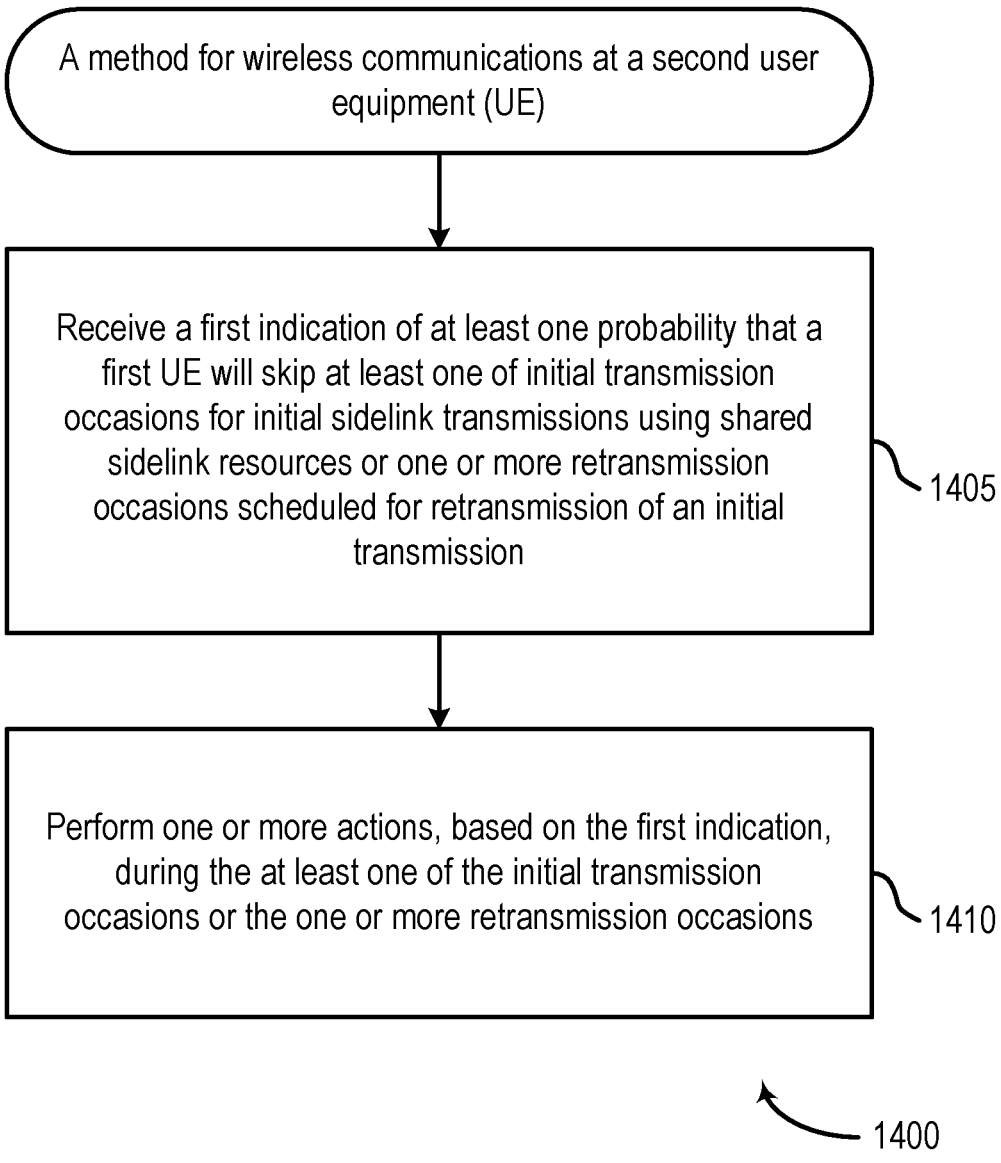

A method for wireless communications at a second user equipment (UE)

Receive a first indication of at least one probability that a first UE will skip at least one of initial transmission occasions for initial sidelink transmissions using shared sidelink resources or one or more retransmission occasions scheduled for retransmission of an initial transmission

1405

Perform one or more actions, based on the first indication, during the at least one of the initial transmission occasions or the one or more retransmission occasions

EXPLOITING UNUTILIZED TRANSMISSION OCCASIONS

BACKGROUND

Field of the Disclosure

Aspects of the present disclosure relate to wireless communications, and more particularly, to techniques designed to enhance resource utilization.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a first user equipment (UE). The method includes receiving sidelink configuration information configuring the first UE with at least initial transmission occasions for initial sidelink transmissions using shared sidelink resources; and transmitting a first indication, to at least a second UE that uses the shared sidelink resources, of at least one probability that the first UE will skip at least one of the initial transmission occasions or one or more retransmission occasions scheduled for retransmission of an initial transmission.

Another aspect provides a method for wireless communications at a second user equipment (UE). The method includes receiving a first indication of at least one probability that a first UE will skip at least one of initial transmission occasions for initial sidelink transmissions using shared sidelink resources or one or more retransmission occasions scheduled for retransmission of an initial transmission; and performing one or more actions, based on the first indication, during the at least one of the initial transmission occasions or the one or more retransmission occasions.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 13 depicts a method for wireless communications.

FIG. 14 depicts a method for wireless communications.

DETAILED DESCRIPTION

Figure 1:
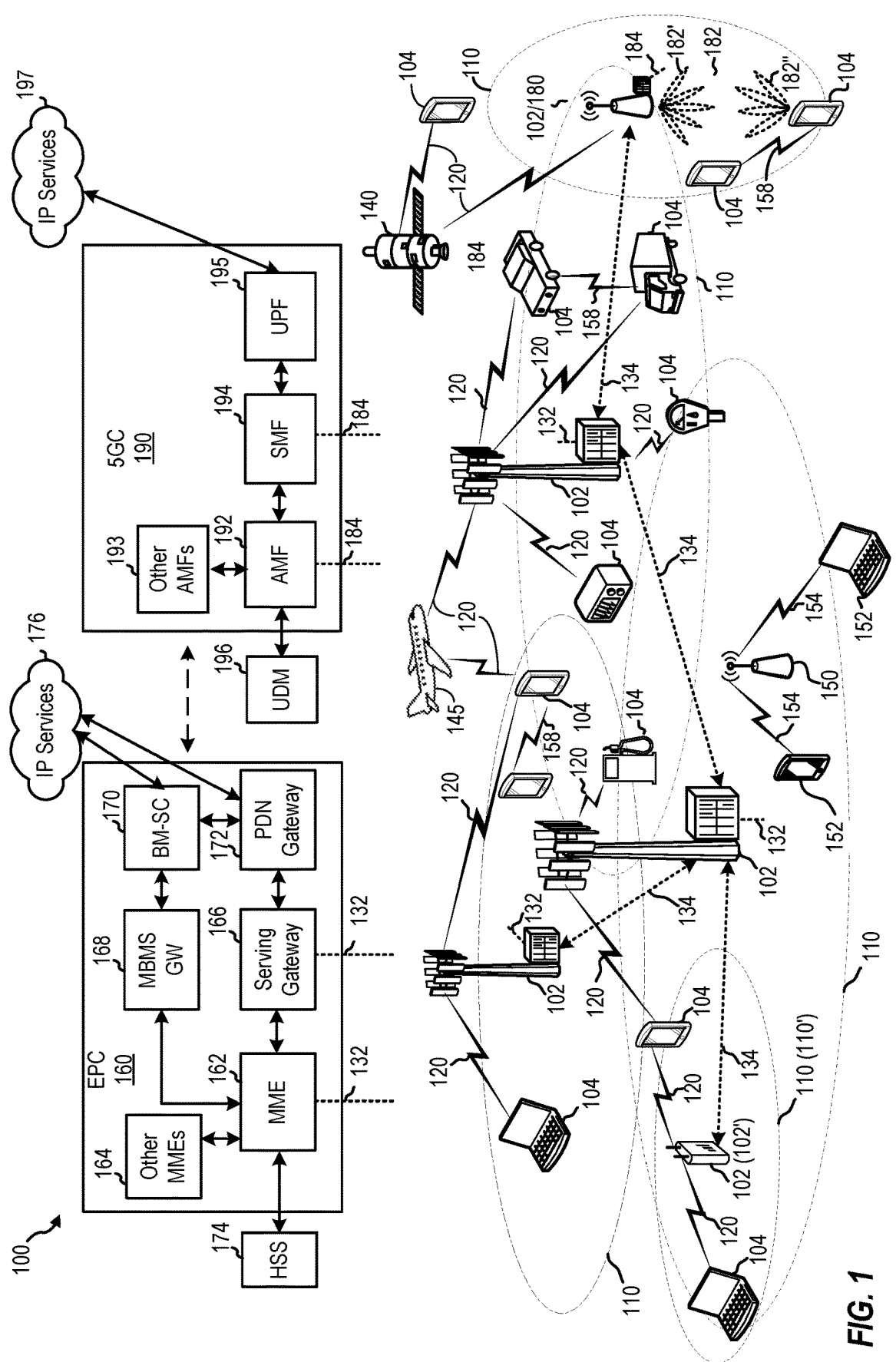
FIG. 1 depicts an example wireless communications network.

Aspects of the present disclosure provide apparatuses, methods, processing systems, and computer-readable mediums for exploiting unutilized sidelink resources.

For example, the techniques may help utilize sidelink resources configured for initial transmissions or retransmissions that would otherwise be unutilized. In certain wireless communications systems, resources that are (pre-)allocated to devices for transmission may ultimately not be used, resulting in resource waste.

For example, for sidelink communications between user equipments (UEs), a network entity (e.g., a base station such as a gNB) may configure a UE with a set of periodic resources, referred to as configured grant (CG) occasions that the UE can use for first (initial) transmission of a transport block (TB). These CG occasions for initial TB transmissions may be referred to as initial Tx occasions. In some systems, each TB can also be retransmitted in two future transmission occasions (for a maximum of three scheduled resources per TB in total). These CG occasions for TB re-transmissions may be referred to as re-transmission (ReTX) occasions.

It is possible that some or all of these schedule resources may not be utilized. For example, if the Tx UE has no TB to transmit, the initial Tx occasion will not be used. Further, if an initial transmission is positively acknowledged (ACK'ed) via a physical sidelink feedback channel (PFSCH), the ReTX occasions will not be used. Thus, if a Tx UE has no TB or receives a positive acknowledgment (ACK), the corresponding Tx occasion resources are wasted.

Aspects of the present disclosure, however, provide a mechanism for utilizing these conventionally unutilized resources. In some cases, a Tx UE may signal an indication of a probability that it is not going to use scheduled resources and thus, a probability that the resources will be available. For example, the Tx UE may signal an indication that an initial Tx occasion is not going to be utilized (e.g., skipped) with 100% probability if it has no TB to transmit and/or may signal an indication that one or more ReTX occasions are not going to be utilized with 100% probability if the Tx UE has received an ACK. In some cases, the Tx UE may signal a 0% probability that it is not going to use scheduled resources (e.g., a 100% probability that it will use the scheduled resources). In some cases, the Tx UE may signal a different probability (e.g., 50%) that it is not going to use scheduled resources. The probability being less than 100% may effectively indicate that there is a chance the UE may end up using/reclaiming these scheduled resources. In such cases, the Tx UE may send a second indication indicating that it will use the scheduled resources.

Thus, the techniques proposed herein may help avoid resource waste and achieve improved resource utilization.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
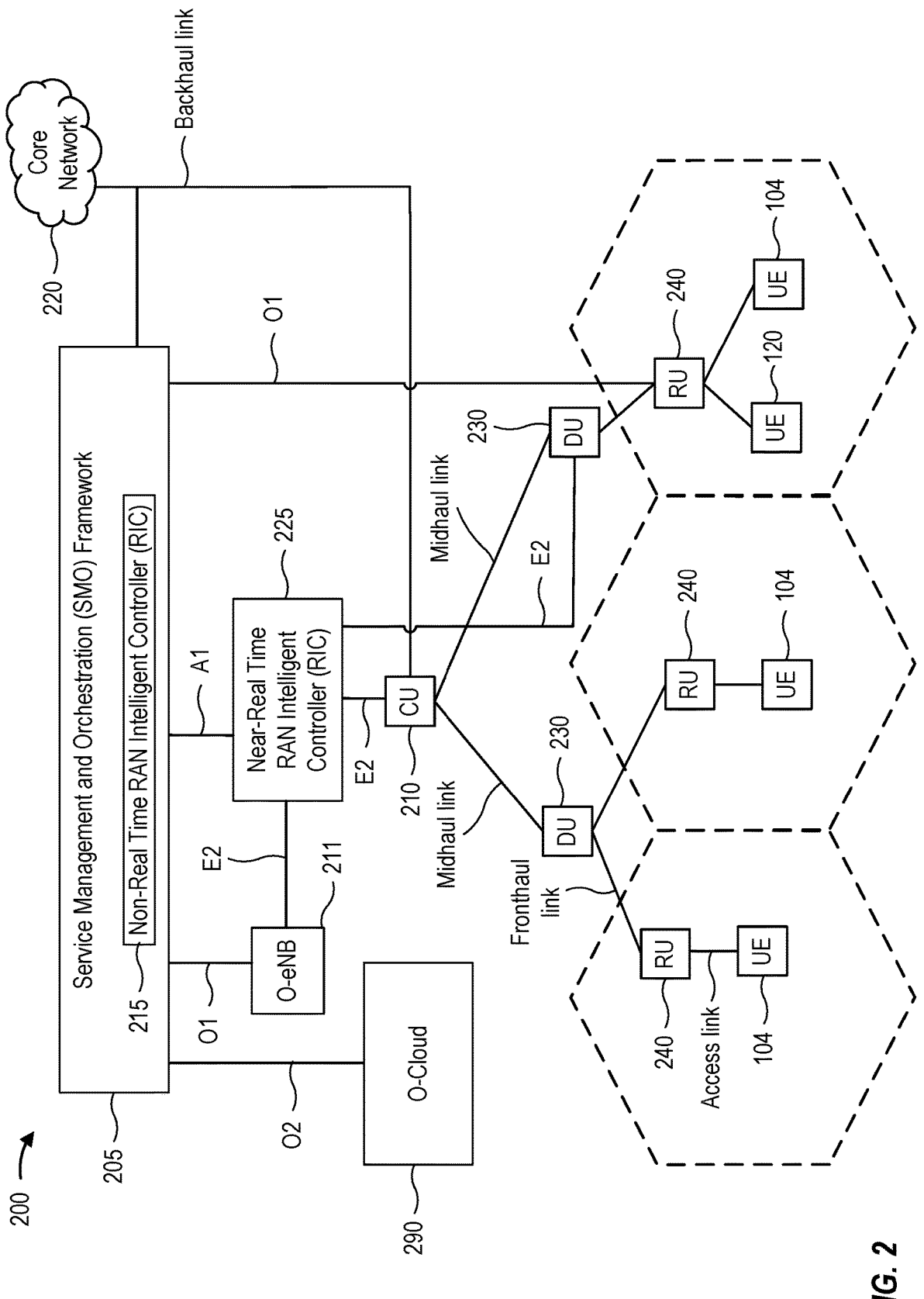
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mm Wave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
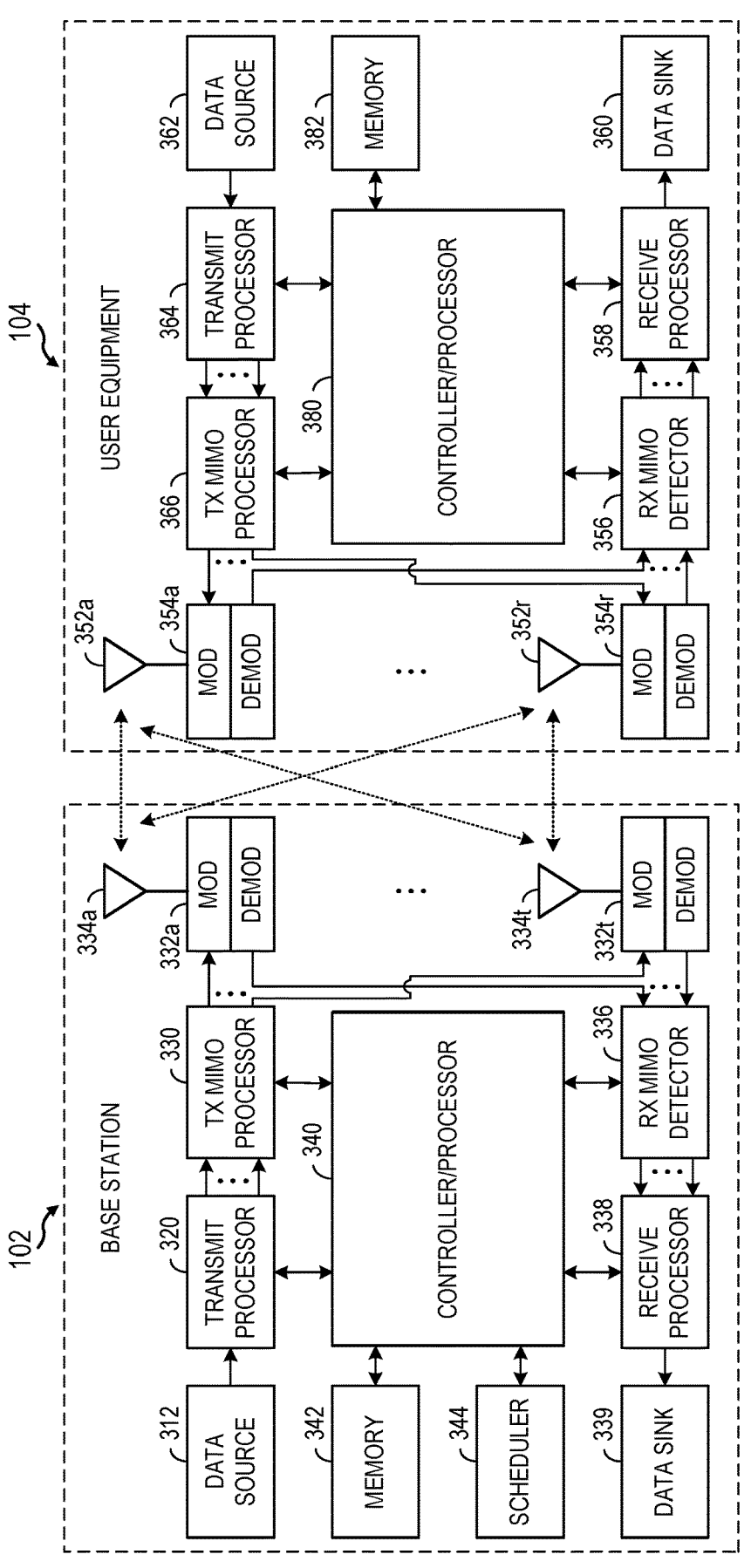
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/ processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
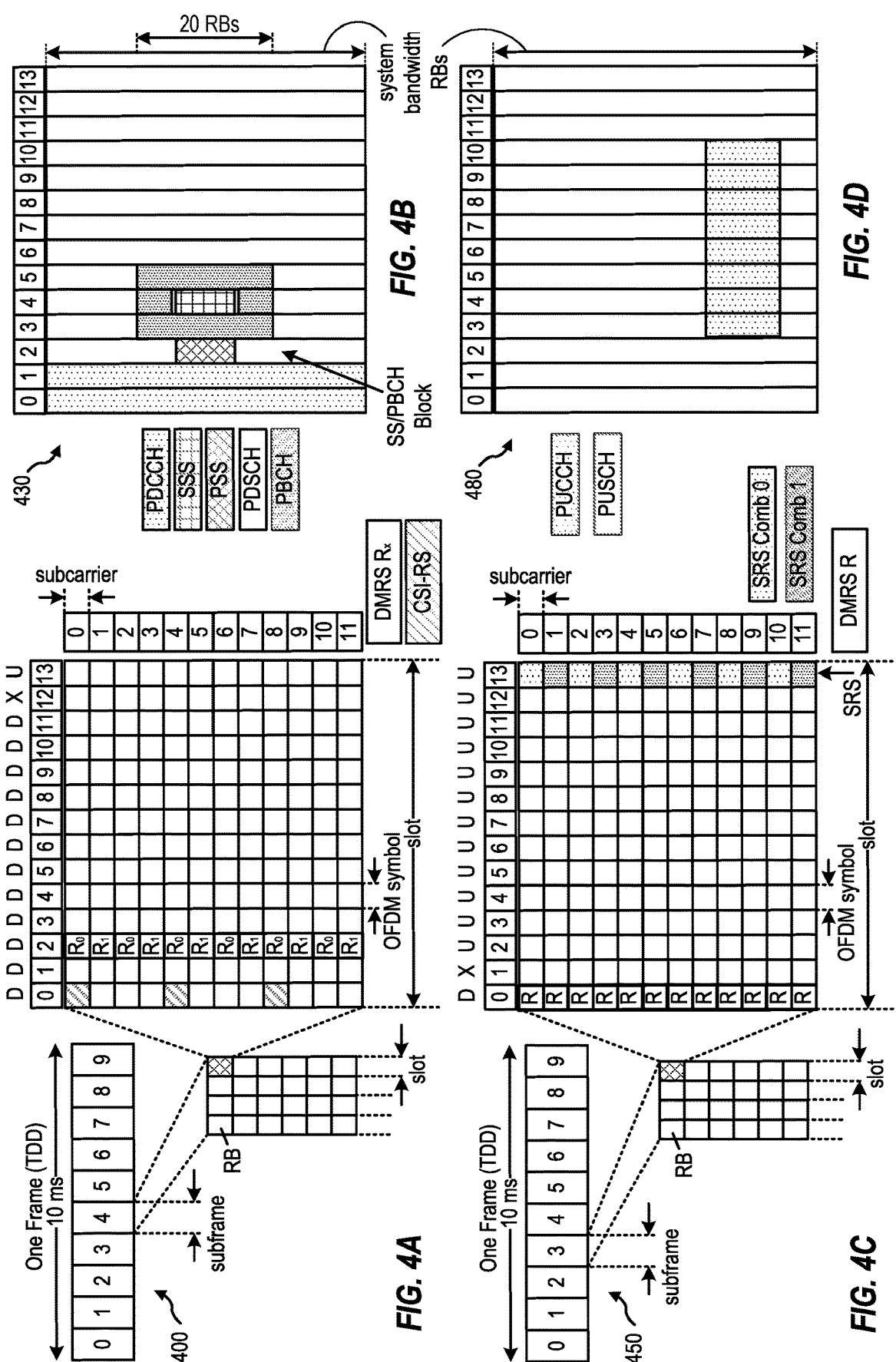
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram

450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2\mu$ slots/subframe. The subcarrier spacing and symbol length/duration are a function of the numerology. The subcarrier spacing may be equal to $2^{\mu} \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Sidelink Communications

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Figures 5A, 5B:
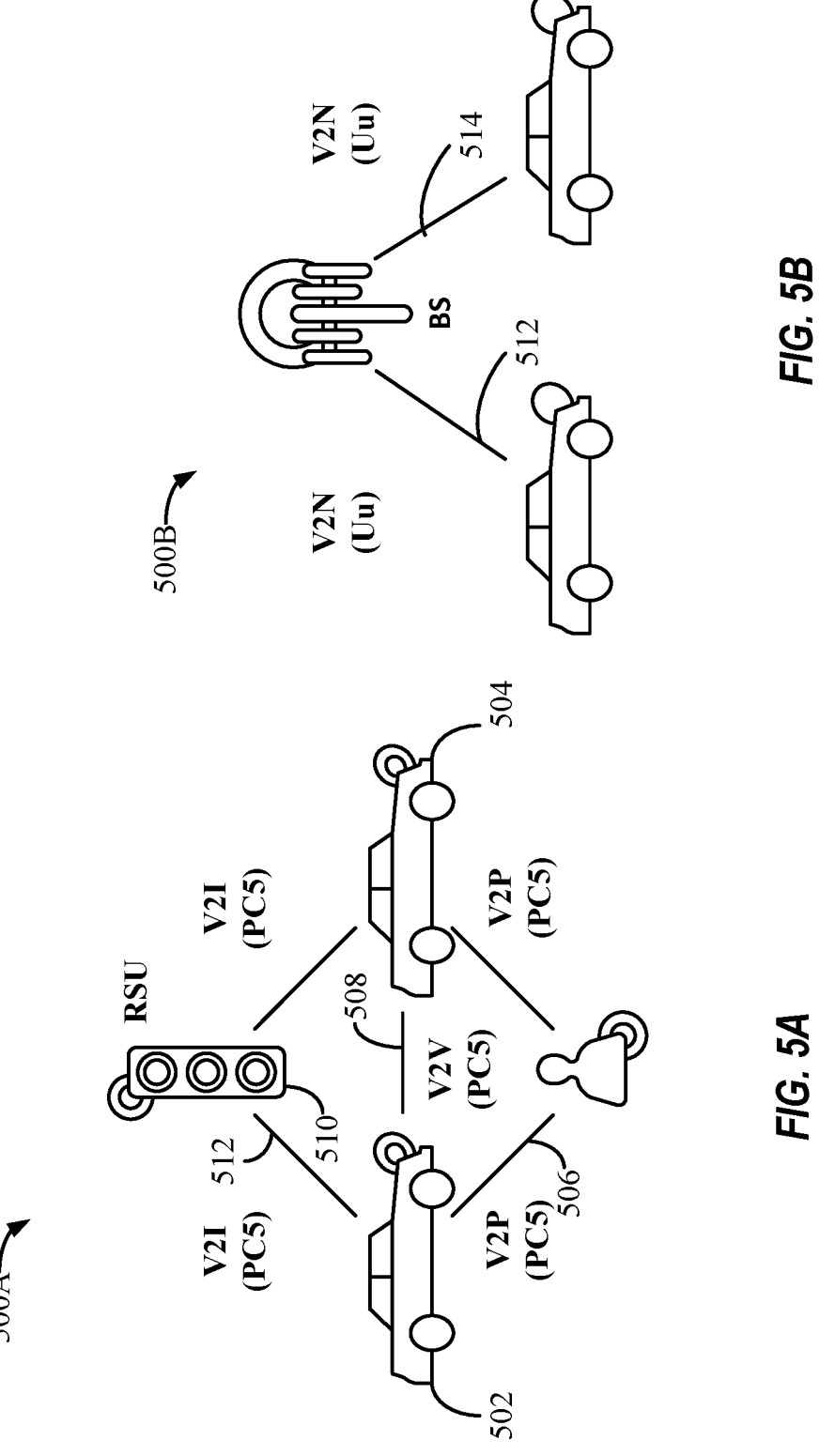
FIGS. 5A and 5B show diagrammatic representations of example vehicle to everything (V2X) systems, in accordance with some aspects of the present disclosure

FIGS. 5A and 5B show diagrammatic representations of example vehicle to everything (V2X) systems in accordance with some aspects of the present disclosure. For example, the vehicles shown in FIGS. 5A and 5B may communicate via sidelink channels and may perform sidelink CSI reporting as described herein.

The V2X systems, provided in FIGS. 5A and 5B, provide two complementary transmission modes. A first transmission mode, shown by way of example in FIG. 5A, involves direct communications (for example, also referred to as side link communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500 (for example, including vehicle-to-vehicle (V2V) communications) is illustrated with two vehicles 502, 504. The first transmission mode allows for direct communication between different participants in a given geographic location. As illustrated, a vehicle can have a wireless communication link 506 with an individual (i.e., vehicle to person (V2P), for example, via a UE) through a PC5 interface. Communications between the vehicles 502 and 504 may also occur through a PC5 interface 508. In a like manner, communication may occur from a vehicle 502 to other highway components (for example, roadside service unit 510), such as a traffic signal or sign (i.e., vehicle to infrastructure (V2I)) through a PC5 interface 512. With respect to each communication link illustrated in FIG. 5A, two-way communication may take place between elements, therefore each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5B shows a V2X system 500 for communication between a vehicle 502 and a vehicle 504 through a communication link 506. These network communications may occur through discrete nodes, such as a base station (for example, an eNB or gNB), that sends and receives information to and from (for example, relays information between) vehicles 502, 504. The network communications through vehicle to network (V2N) links 512 and 514 may be used, for example, for long-range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (e.g., UEs) may communicate with each other using sidelink signals. As described above, V2V and V2X communications are examples of communications that may be transmitted via a sidelink. When a UE is transmitting a sidelink communication on a sub-channel of a frequency band, the UE is typically unable to receive another communication (e.g., another sidelink communication from another UE) in the frequency band. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications.

Overview of SL MU-MIMO

Figure 6A:
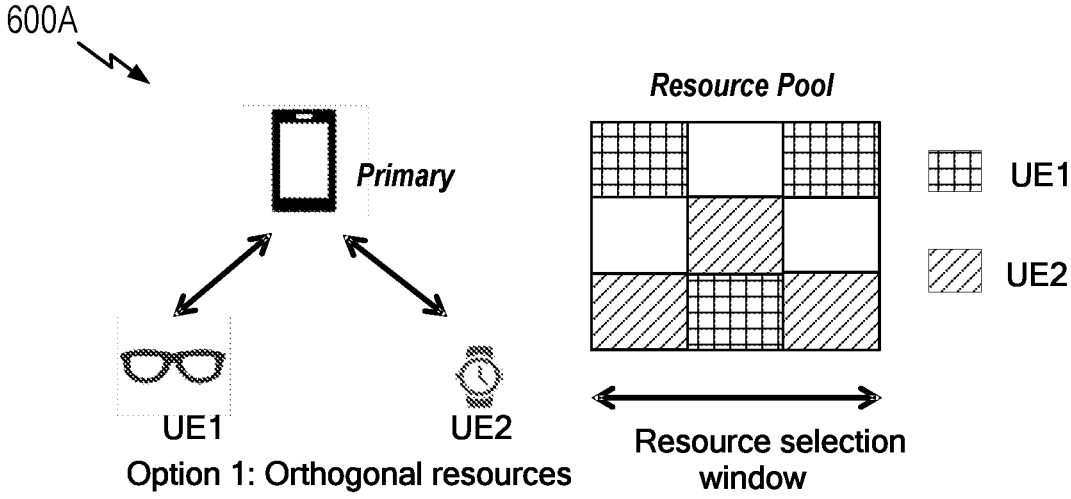
FIGS. 6A and 6B depicts example resource selection for multiple input/multiple output wireless communications, according to various aspects described herein.
Figure 6B:
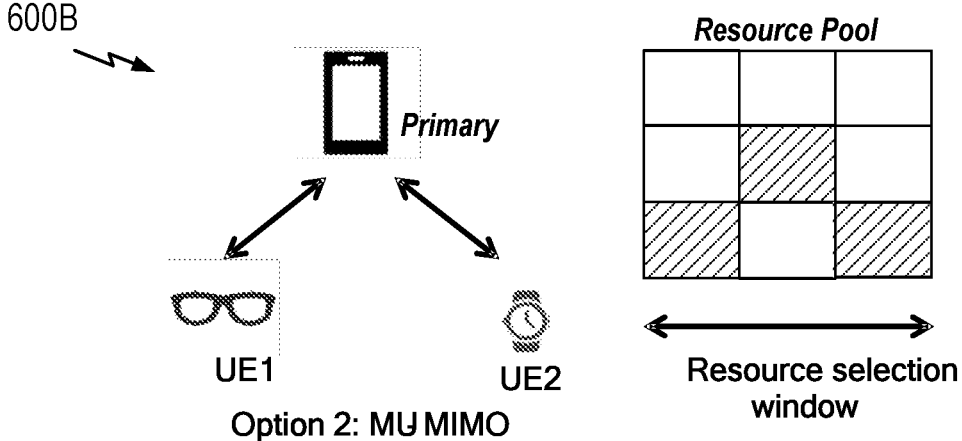

In some cases, sidelink (SL) UEs may transmit in a multiple user multiple input multiple output (MU-MIMO) mode. In such cases, as illustrated in FIGS. 6A and 6B, a primary UE may can transmit to/receive from multiple remote UEs on shared resources (of a shared resource pool). As illustrated in FIG. 6A, the remote UEs could be assigned orthogonal (non-overlapping) resources. In such cases, the UEs could operate in MU or single user (SU) mode.

As illustrated in FIG. 6B, the remote UEs could be assigned the same resources. For example, in such cases, the primary UE could guide the remote UEs to transmit on indicated ports. As an example, assuming Mode 1 operation (where a gNB schedules the remote UEs) or the primary UE schedules the remote UEs, the remote UEs can be instructed to transmit on the same resources, with transmission parameters designed to help ensure separability at the receiver.

Overview of PSFCH Resource Mapping

Figure 7A:
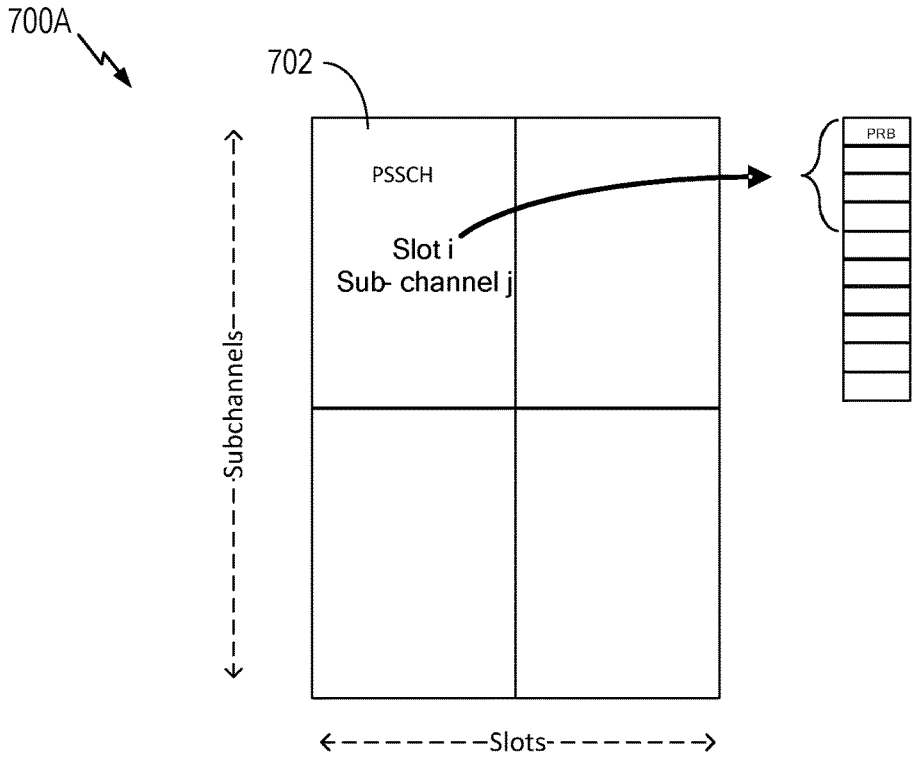
FIGS. 7A and 7B depict examples of physical sidelink feedback shared channel (PSFCH) resource mapping, according to various aspects described herein.

FIG. 7A is an example of how resources of a common resource pool 700A may be allocated for sidelink communications (broadcast and groupcast device-to-device or D2D) between UEs (e.g., UEs 104 shown in FIG. 1). The common resource pool 700A includes slots and subchannels. Resources may be allocated as combinations of subchannels and slots, used for physical sidelink shared channel (PSSCH) 602 transmissions. In the illustrated example, PSSCH is allocated one slot (slot i) and one sub-channel (j).

FIG. 7A also depicts how PSSCH may be mapped to physical sidelink feedback channel (PSFCH) resources. In general, there is a mapping between a PSSCH and the corresponding PSFCH resource based on the starting subchannel of PSSCH (sl-PSFCH-CandidateResourceType is configured as startSubCH). The mapping could also be based on the number of subchannels in a PSSCH (sl-PSFCH-CandidateResourceType is configured as allocSubCH), the slot containing PSSCH, the source ID, and the destination ID. The number of available PSFCH resources may be dictated by the number of UEs or UE pairs sharing the resource pool 700A (e.g., the number of UEs in groupcast option 2).

Figure 7B:
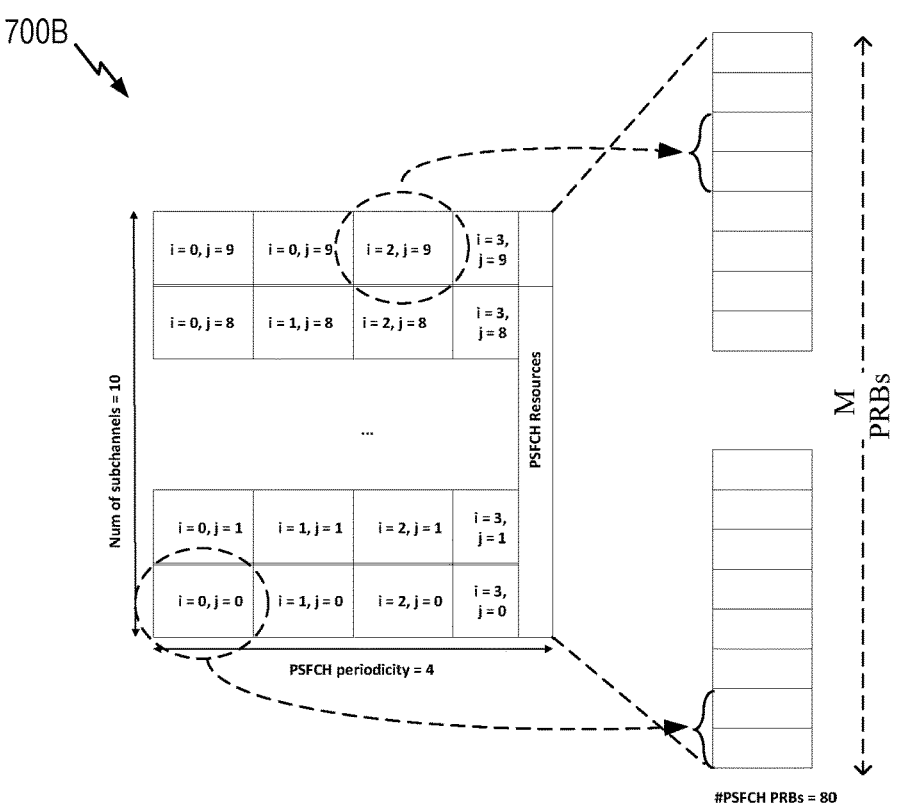

FIG. 7B depicts an example of PSFCH resource determination, based on a mapping of subchannels/slots (i, j), in greater detail. In general, a UE may allocate physical resource blocks (PRBs) from $$M_{PRB,set}^{PSFCH}$$

PRBs to slot i and sub-channel j of resource pool 700B (allocated for PSSCH transmissions), as follows:

$$\left[\left(i + j \cdot N_{PSSCH}^{PSFCH}\right) \cdot M_{subch,slot}^{PSFCH}, \left(i + 1 + j \cdot N_{PSSCH}^{PSFCH}\right) \cdot M_{subch,slot}^{PSFCH} - 1\right],$$

PRBs from $$M_{PRB,set}^{PSFCH}$$

PRBs to slot i and sub-channel j, where i is between 0 and the PSFCH periodicity $$N_{PSSCH}^{PSFCH}$$

and j is between 0 and the total number of subchannels $N_{subch}$:

$$0 \le i \le N_{PSSCH}^{PSFCH}$$

and $$0 \le j \le N_{subch}.$$

In the illustrated example, $$N_{PSSCH}^{PSFCH} = 4 \text{ and } N_{subch} = 10,$$

and the total number of PRBs for PSFCH is 80, so the number of PSFCH PRBs per PSFCH is 2:

$$M_{subch,slot}^{PSFCH} = N_{PSFCH\_PRBs} / \left(N_{PSSCH}^{PSFCH} * N_{subch}\right) = 80 / (4 * 10) = 2.$$

In other words, in this example, each PSSCH slot/sub-channel is associated with 2 PSFCH PRBs (e.g., though PSFCH may be only sent on one of them).

Aspects Related to Exploiting Unutilized Transmission Occasions

In some cases, a sidelink UE may skip an occasion due to, for example, a lack of data or energy, a conflict between air interface (e.g., Uu interface) and sidelink communications.

Certain wireless communication standards (e.g., 3GPP) allow for a UE to perform some prioritization between sidelink and Uu link when resources overlap. In some cases, for example, a UE may adjust power and transmit both sidelink and Uu. In other cases, a UE may cancel one of the two (e.g., due to prioritization or power limitations). This may be considered as "skipping" or "cancellation" of Uu or sidelink transmission due to power limitation or prioritization.

For low power devices (e.g., reduced capability or Red-Cap devices), since RF may be mostly shared between Uu and sidelink, radio resource management (RRM) measurement performed on Uu interface may impact sidelink. This may be considered as skipping/cancellation of both Uu and sidelink due to RRM.

In some cases, a UE may have limited power to transmit, but then the UE may obtain enough power (e.g., through charging) to transmit. This may be the case, for example, for very low power devices relying on energy harvesting (EH) In some cases, a UE helping an ambient internet of things (IoT) device (e.g., through RF signal(s) transmission or powering) may cancel/skip the transmissions ahead of time (e.g., because the UE is scheduled to perform other tasks or because of energy/power limitations). In such cases, the UE may then obtain enough energy, and the UE may decide to help. In other words, the UE may decide to reuse the skipped resources.

As noted above, in some cases, periodically scheduled resources for sidelink transmissions (e.g., PSSCH) may not be utilized. For example, if the Tx UE has no TB to transmit, PSSCH resources scheduled for an initial Tx occasion will not be used (e.g., skipped). Further, if an initial transmission is positively acknowledged (ACK'ed) via a PFSCH, the resources allocated/scheduled for ReTX occasions may not be used. Thus, if a Tx UE has no TB or receives a positive acknowledgment, the corresponding resources scheduled for these Tx occasions may be wasted.

Aspects of the present disclosure, however, provide a mechanism for utilizing these conventionally unutilized resources. In some cases, a Tx UE may signal an indication that it is not going to use scheduled resources and these resources are available. For example, the Tx UE may signal an indication that an initial Tx occasion is not going to be utilized if it has no TB to transmit and/or may signal an indication that one or more ReTX occasions are not going to be utilized if the Tx UE has received an ACK. In some cases, the Tx UE may explicitly signal an indication of used or unused occasions (e.g., of a positively acknowledged TB) to other UEs. In some cases, information regarding used or unused occasions may be relayed to other UEs by an entity other than the Tx UE (e.g., by a UE, controller, or network entity/gNB) that obtained such information itself by any of the techniques described herein.

Figure 8:
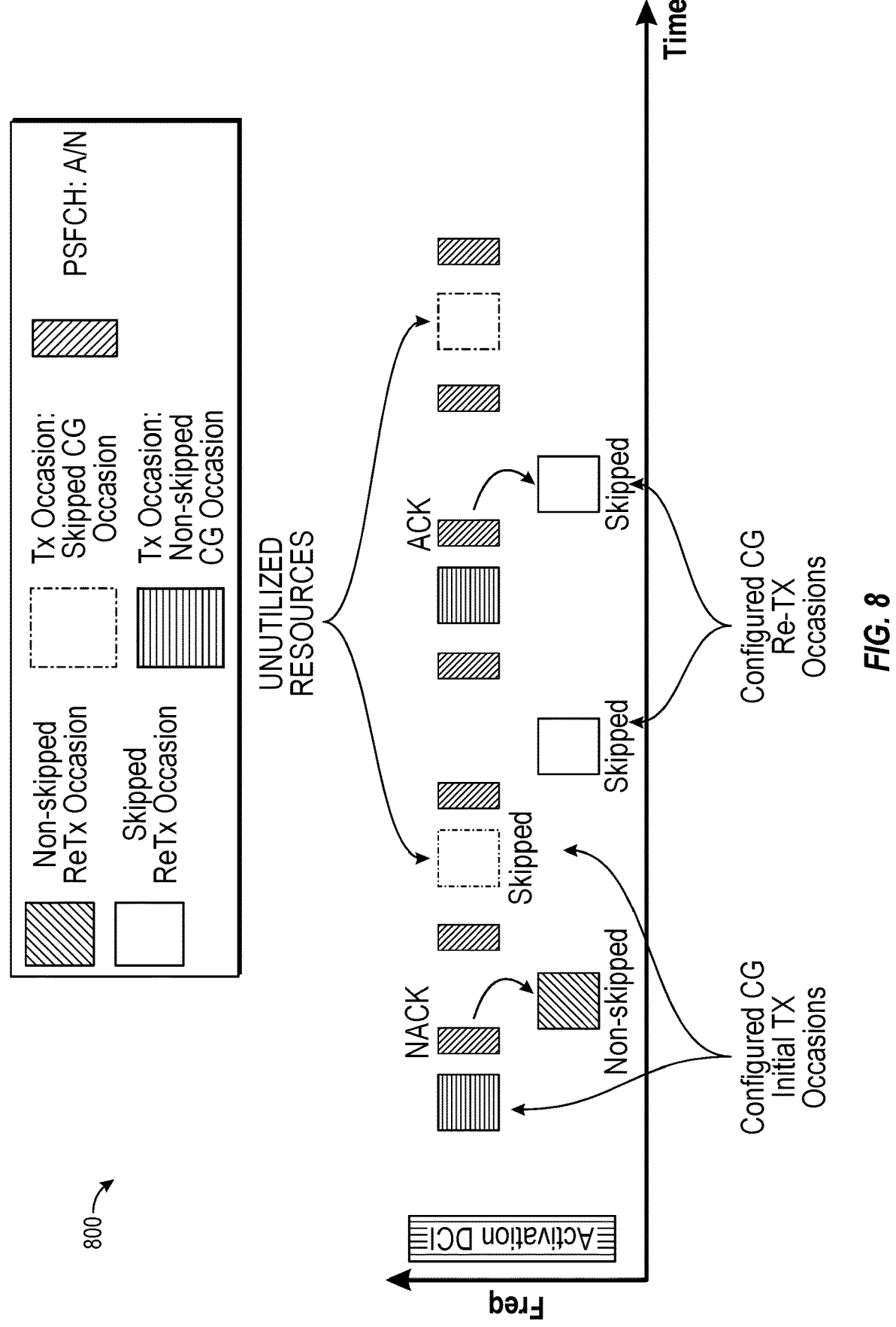
FIG. 8 depicts example sidelink configured grant (CG) transmission occasions.

Examples of how resources allocated for Tx occasions may be wasted are illustrated in FIG. 8. In conventional sidelink scenarios (e.g., according to NR Release 16 V2X), a gNB may configure a UE with configured grants (CGs) of different types, type 1 and type 2. The general difference between type 1 and type 2 CG configurations is that type 2 is activated with DCI, and the ReTX resources are scheduled in DCI (whereas in type 1, all Init Tx and ReTX resources are configured via RRC).

The example illustrated in FIG. 8 assumes type 1 CGs with an activation DCI. As illustrated, a gNB may configure a UE with a set of periodic resources/CG occasions to be used for initial transmission of new transport blocks (TBs), referred to as initial Tx occasions. Each TB may also be retransmitted in up to two future resources, in ReTX occasions (e.g., for a maximum of 3 scheduled resources per TB). In FIG. 8, every other Init-TX is skipped, meaning these resources, as well as the corresponding ReTX resources are wasted.

In the example illustrated in FIG. 8, there is a single (1) scheduled ReTX occasion for each TB, where these resources are only utilized by the Tx UE if the original TB was negatively acknowledged (NACK'ed), as indicated by a PSFCH. As described above, PSFCH has a certain periodicity, and a TB cannot typically be retransmitted before its corresponding ACK/NACK is sent (in the PSFCH resources according to the resource mapping described above).

Thus, because ReTX occasions are only used when needed, the CG process can be conceptualized as that a NACK (conveyed via PSFCH) activates the use of these resources. In conventional systems, the gNB indicates in DCI the time/frequency offsets of these resources (assuming resource sizes are the same across all transmissions). These indicated resources are utilized whenever a NACK is observed, but if no NACK is observed, then these resources are wasted.

In the example illustrated in FIG. 8, the first non-skipped Init-TX CG Occasion is NACK'ed, therefore the first ReTX Occasion is not skipped. On the other hand, the second non-skipped Init-TX CG Occasion is ACK'ed, therefore the ReTX Occasion for this Init-TX is not skipped.

As illustrated by the example in FIG. 8, there are two cases of configured resources that can be exploited: skipped Init TX Occasions (skipped if a TX UE has no TB to transmit) and skipped ReTX Occasions (skipped if the TX UE has not TB to transmit or if an Init TX is ACK'ed).

Resources may be exploited to advantage, particularly when a group of UEs share a common resource pool (transmitting on the same resources) and are operating in a multiple user multiple input multiple output (MU-MIMO) mode. In other words, if a first UE learns that a second UE is going to skip a Tx Occasion (whether Init Tx or ReTX), the first UE may transmit using a single user (SU) MIMO mode rather than MU MIMO mode and transmit using different Tx parameters than if the second UE were transmitting on the same resources. Thus, exploited resources, in this context, may mean that UEs transmit using different power levels, different demodulation reference signal (DMRS) patterns, a higher number of ports (e.g., rate-matching around the ports that were going to be used by the other UE is not needed), than when the original UE is not using the resources. The techniques described herein for exploiting skipped resources may be applied in various cases, such as Mode 1 resource allocation (RA), where a gNB schedules a maximum of 2 ReTxs for a single TB, as well as Mode 2 RA, where a UE reserves up to 2 resources for ReTx.

Aspects of the present disclosure provide techniques for exploiting the skipped (Tx and ReTx) resources/occasions from CGs, where TX-UEs performing MU-MIMO on the same resources, as described above with reference to FIG. 6B, can exploit all dimensions once the other TX-UE has no traffic (no TB) or an ACK is observed after a Tx occasion (hence, all ReTx occasions are wasted). The techniques described herein may be applied in a variety of scenarios, for example, where there is a main/primary node using a set of resources shared with M other nodes, when the primary node is not planning to use the resources.

The techniques described herein for exploiting the skipped (Tx and ReTx) resources/occasions from CGs may be utilized for Mode 1 as well as Mode 2 resource allocation. In Mode 1 RA, UEs request resources to a network entity (e.g., base station/gNB) for the transmission of each TB (and possible blind or HARQ retransmissions). UEs send a Scheduling Request (SR) to the gNB using the physical uplink control channel (PUCCH), and the gNB responds with the DCI conveyed via a physical downlink control channel (PDCCH). The DCI indicates the SL resources allocated for the transmission of a TB and up to 2 ReTxs. Hence, similar to the case of configure grants, in Mode 1 RA, the ReTx resources can be exploited by other UEs.

In Mode 2 RA, the TX-UE/RX-UE will handle the search for resources and for ReTx resources. UEs operating in Mode 2 RA may also exploit skipped (Tx and ReTx) resources/occasions. For example, UEs operating in Mode 2 RA may monitor ("listen") for PSFCH transmissions acknowledging transmissions. In such cases, the UEs may be able to exploit (re-use) the corresponding ReTX resources that will not be used due to the positive acknowledgment.

Aspects of the present disclosure may help avoid wasting unutilized resources, for example, in a MU-MIMO setting (as shown in FIG. 6B) where two UEs are using the same resources to communicate to the same RX-UE or in the case of two UEs are communicating with two different RX-UEs. In such cases, the two UEs using the same resources can switch between SU-MIMO and MU-MIMO based on the other UE data arrival status.

In some cases, if a UE finds out that it has no TB (or does not plan to transmit due to a lack of energy) to transmit in the next one or few Tx CG occasions, that UE may send an indication to the other TX-UEs (or to both the other TX-UEs and the RX-UE). As noted above, in some cases, the indication may explicitly indicate used or unused occasions (e.g., of a positively acknowledged TB) to these other UEs.

Figure 9:
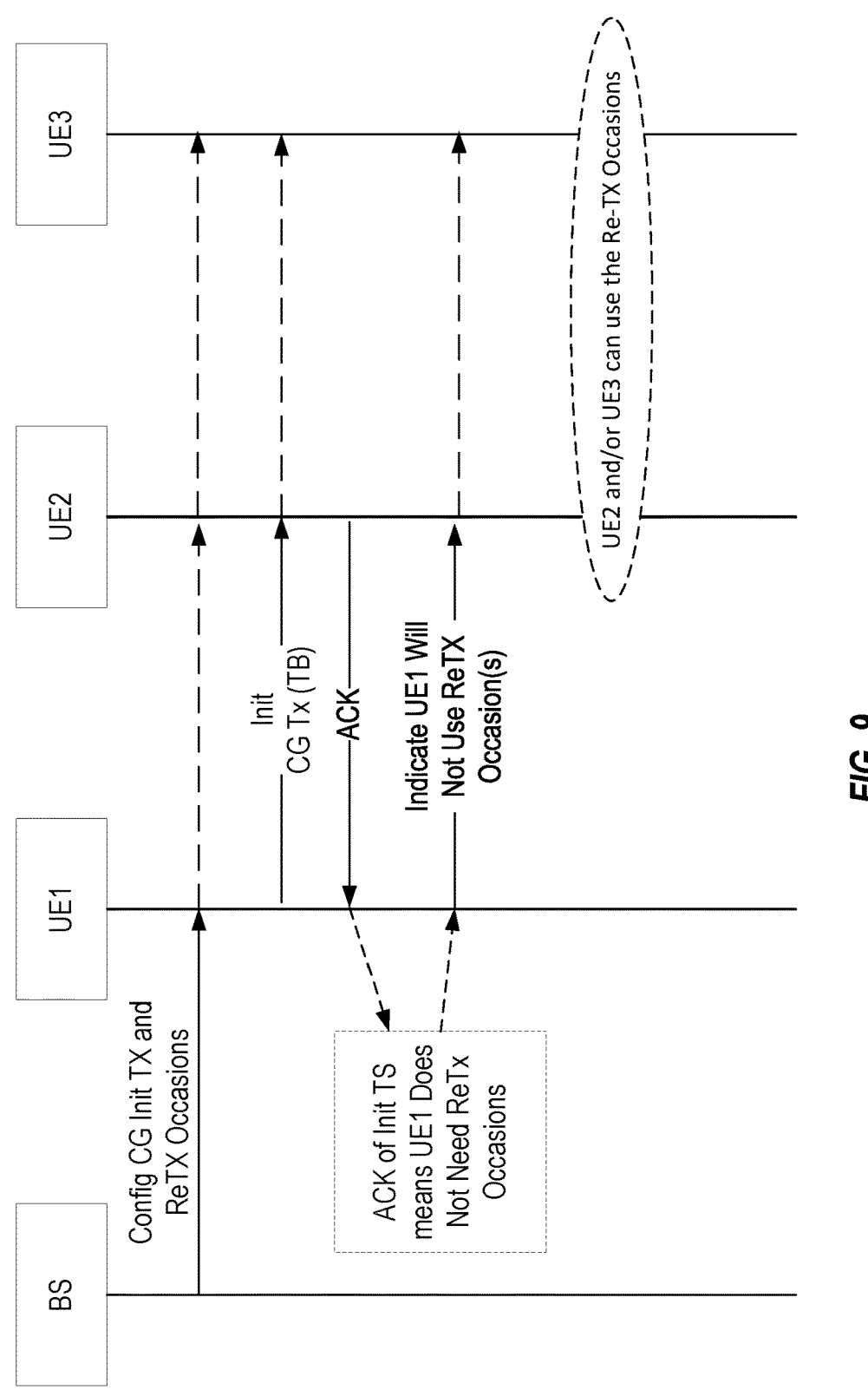
FIG. 9 depicts a call flow diagram for exploiting unutilized resources.

An example of this scenario is illustrated in the call flow diagram 900 of FIG. 9. In the illustrated example, a first UE (UE1) and other UEs (UE2 and UE3) are configured with a set of Init TX occasions and ReTX occasions.

In the illustrated example, UE1 sends a TB to UE2 in an initial Tx Occasion and UE2 positively acknowledges receipt of the TB (as indicated in an ACK conveyed via a PSFCH). Because UE2 ACKs the initial transmission, UE1 does not need the configured Re Tx occasions. Thus, UE1 sends an indication (e.g., to UE2 and/or UE3) that it will not use the Re Tx occasions.

In addition to skipping a Tx occasion due to not having a TB or due to receiving an ACK, a UE could skip a TX occasion if that UE is engaged in a higher priority task (e.g., in Uu link or SL). In either case, the indication sent by UE1 can include a CG index of the TX occasion(s) to be skipped, so that the UEs (UE2 and UE3) know which Tx Occasion resources are available. Based on this indication, UE2 and/or UE3 can use these resources.

The indication may be provided in any suitable signaling or messaging. For example, the indication may be conveyed via a sidelink (PC5) RRC message or MAC-CE (e.g., when the CG periodicity is relatively large) or via a physical sidelink shared channel (PSSCH) carrying the second state of a two-stage sidelink control information (SCI), or PSSCH/SCI-2. In a Mode 2 RA manner, the TX-UEs that have no data can find resources to communicate to the other UEs the (skipping) indication that they will not use a next TX occasion. As noted above, skipping an initial TX occasion also implies that the corresponding ReTx occasions can also be utilized by the other UEs. In addition, or as an alternative, in some cases, information regarding used or unused occasions may also be relayed to other UEs by an entity other than the Tx UE (e.g., by a UE, controller, or network entity/gNB) that obtained such information itself by any of the techniques described herein.

In some cases, certain resources may be dedicated for providing an indication of skipped Tx occasions. For example, as illustrated in FIG. 10, special dedicated resources may be configured (e.g., by a gNB) for each CG in order to provide this indication.

For the dedicated resources, the gNB can assign certain resources where each UE can indicate the status of using the next CG occasion. The resource size can be as small as one PRB where a TX-UE can send a 0 or 1 sequence-based encoding, which may be similar to PSFCH/PUCCH format 0. The resources may be overheard by all UEs participating in using the MU-MIMO. The dedicated resources time/ frequency location can be a function (or mapped based on) a corresponding CG index.

Figure 10:
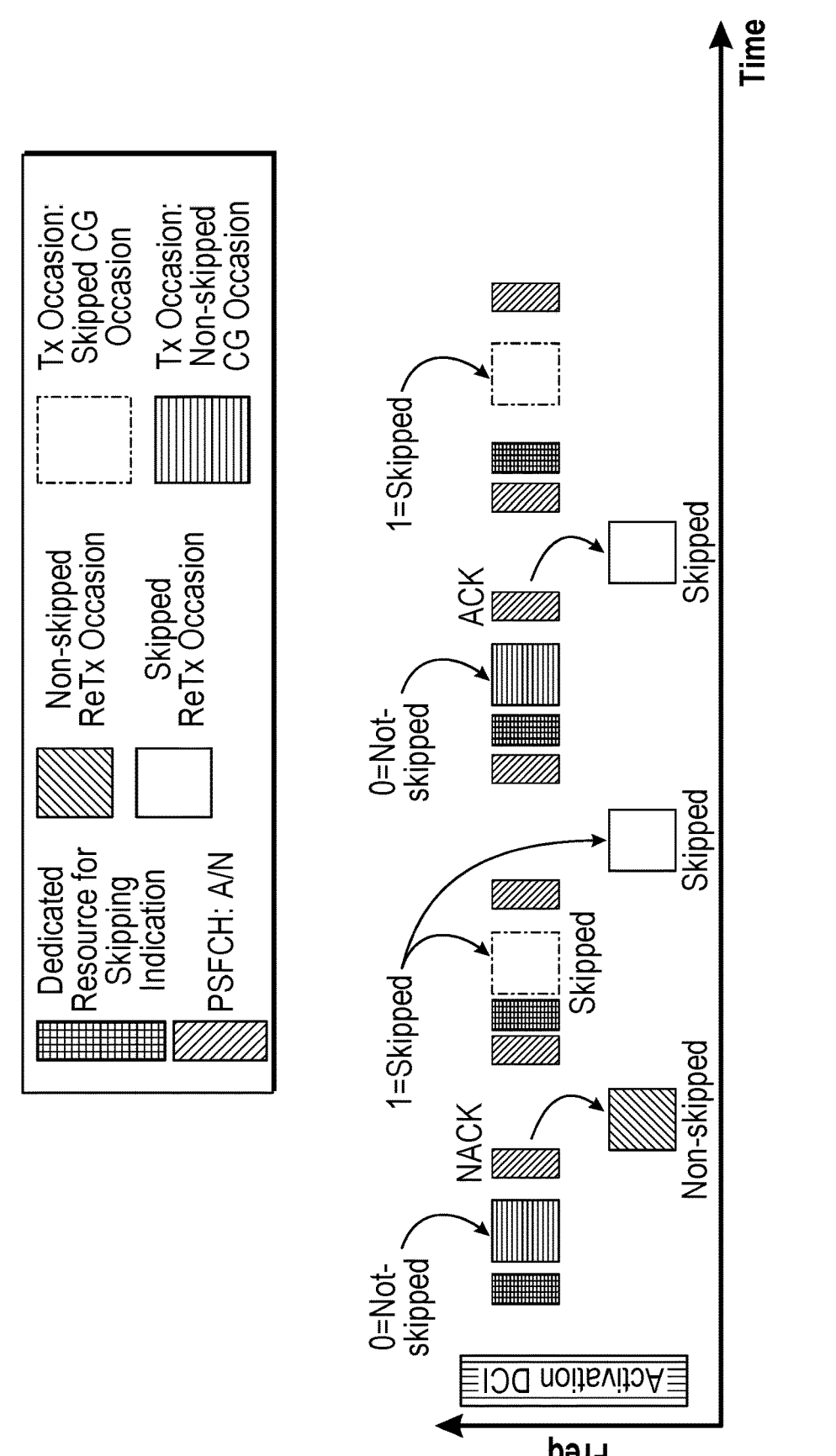
FIG. 10 depicts example sidelink CG transmission occasions with dedicated resources, according to various aspects described herein.

In the example illustrated in FIG. 10, the TX UE indicates, via the dedicated resource, that the first Init-TX CG Occasion is not going to be skipped (e.g., by indicating a 0 via sequence-based encoding). On the other hand, the TX UE indicates, via the dedicated resource, that the second Init-TX CG Occasion (and corresponding ReTX Occasion) is going to be skipped (e.g., by indicating a 1 via sequence-based encoding). In a similar manner, in the illustrated example, the TX UE also indicates that the third Init-TX CG Occasion will not be skipped (Skipping Indication=0) and that the fourth Init-TX CG Occasion will be skipped (Skipping Indication=1).

As noted above, the techniques described herein for exploiting skipped ReTx occasions may also be applied to scenarios where two Tx UEs transmit (to a receiver/RX UE) on a common set of resources. This scenario may apply in the scenario of configured grant (CG) occasions, Mode 1 RA, and Mode 2 RA.

This scenario may be understood, assuming two TX UEs (e.g., UE1 and UE2 of FIG. 6A or 6B) communicate with an RX-UE. In such cases, a ReTX occasion of one of the TX-UEs may be used by the other. For example, assuming the packet of TX-UE1 was NACK'ed by the RX UE while the packet of TX-UE2 was ACK'ed. In this case, TX-UE1 can exploit the resource or dimensions (not used by TX-UE2) for its TB retransmission.

This scenario may assume that the TX-UEs (involved in the transmissions and using the CG occasions) can overhear each other's PSFCH feedback. If the TX-UEs have been previously communicating, they may know each other's source IDs and destination IDs (since they both communicate with the same RX-UE).

In some cases, the TX-UEs sharing the CG(s) may share the source IDs or the gNB can signal this information (e.g., since the gNB is the one that assigns the resources). In some cases, the UEs can communicate with each other (e.g., using PC5-RRC/MAC-CE) to share the source ID, destination ID, and/or any other parameters used to determine the available resource. For example, in MU-MIMO PSFCH, the UEs may use the DMRS port index.

There are various options for how the TX-UEs may learn of the resources used by the other. In some cases, the UEs can share the location of the PRB(s) that each one of them will use (e.g., via a bitmap or PRB index) and the Rx-UE can inform each Tx-UE where to look to listen for (and intercept) the ACK/NACK feedback it provides to the other Tx-UE. In some cases, information regarding ACK/NACK feedback may be transmitted or relayed to other UEs. For example, an entity that obtains information regarding the resources used for ACK/NACK and/or ACK/NACK results (e.g., by sensing, intercepting, or explicit signaling) may forward this information to other UEs.

For MU-MIMO, in some cases, the port index may be used as a way to determine the (PSFCH) feedback PRB from an RX-UE. In such cases, it may be relatively easy for MU-MIMO users to determine each other's PRBs (e.g., based on feedback from Rx-UE). In some cases, the Rx-UE can directly indicate to the Tx-UEs whether to use MU-MIMO or SU_MIMO in retransmission.

The techniques described herein for exploiting skipped ReTx occasions may also be applied to scenarios where more than two Tx UEs transmit (to a receiver/RX UE) on a common set of resources. This may apply to various cases, such as when TX UEs (involved in MU-MIMO) randomly use resources not utilized for ReTX or when a set of UEs not involved in a transmission use the ReTX occasions.

In the first case, when TX UEs involved in MU-MIMO randomly use resources not utilized for ReTX, the UEs may utilize the resource randomly, once an ACK is overheard. In some cases, the UEs may be ordered to use each other resources with some type of priority. For example, assuming three UEs and three ports, where each port is utilized by a UE, there may be three statuses: UE 1 will use the slot, UE 2 will not use the slot, UE 3 will use the slot. In such cases, the gNB can configure UE 1 to always use (exploit) the port of UE 2, may configure UE 3 to use (exploit) port of UE 2, or similar. In some cases, there may be a predefined behavior when a port is empty or when a certain UE' resources are not used.

When a set of UEs is not involved in using a CG for transmission, there are various options for how they can use the ReTX occasions (when available). According to a first option, the UEs can sense the resources (e.g., using "legacy" mode 2 sensing) instead of overhearing the ACK/NACK on PSFCH (e.g., if they sense the initial TX resources are not used, they may assume the corresponding ReTx resources are available). According to a second option, the UEs can overhear the PSFCH feedback (e.g., assuming they know the PSFCH RBs to listen for). A third option may be considered a combination of the first and second options. For example, the UEs may perform sensing of the TX occasions, then also listen for the PSFCH. In some cases, for a set of UEs not involved in the CG occasion, but using the ReTX resources, there may be a defined behavior or pairing between the set of UEs and a UE assigned to use the CG (owning the resources). For example, the predefined behavior may be based on some type of priority assigned the different UEs in the set. If ReTX resources are found to be available, one or more of the UEs may re-use the resources, based on the assigned priorities.

As noted above, a UE may skip one or more sidelink resources and (an initial transmission on) a sidelink resource may be retransmitted up to 2 times. In some cases, CG occasions and/or retransmissions may be skipped. In such cases, other UEs may use the skipped retransmission occasions (e.g., randomly, through sensing, or other means).

Aspects of the present disclosure define rules and signaling for reusing skipping occasions that may enhance resource utilization. For example, the rules may take into consideration the possibility that a UE may indicate skipping (e.g., early enough to allow the network or other UEs to use the resources), but certain circumstances may change before the resources occur (e.g., UE obtained enough energy to transmit or a new arrival occurs).

Figure 11:
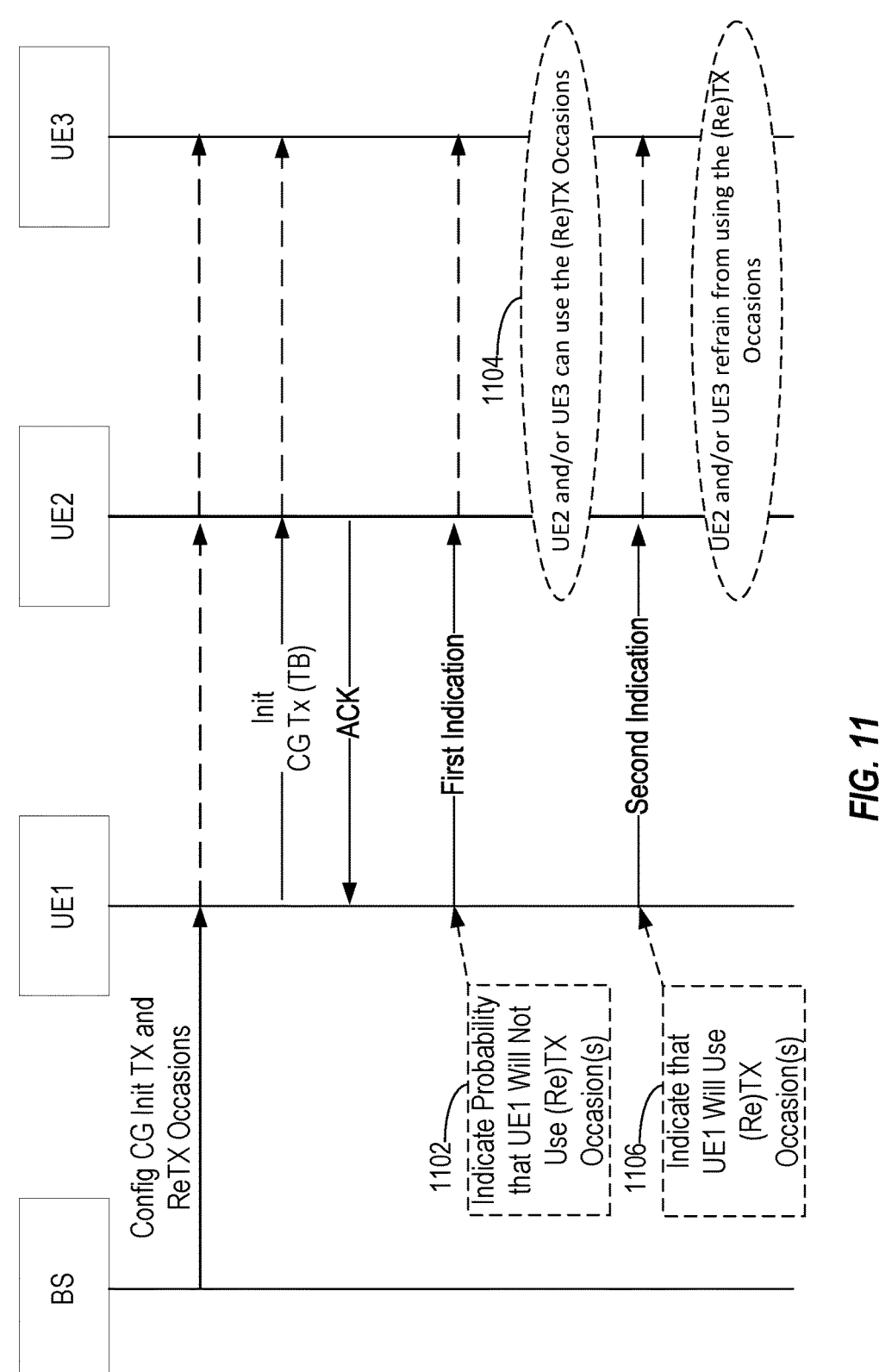
FIG. 11 depicts a call flow diagram for exploiting unutilized resources, according to various aspects described herein.

FIG. 11 depicts a call flow diagram 1100 for exploiting unutilized resources, according to various aspects described herein. In some aspects, the UEs shown in FIG. 11 may be examples of the UE 104 depicted and described with respect to FIGS. 1 and 3. Similarly, the network entity shown in FIG. 11 (BS) or may be an example of the BS 102 (e.g., a gNB) depicted and described with respect to FIGS. 1 and 3 or a disaggregated base station depicted and described with respect to FIG. 2.

Similarly to call flow diagram 900 described above with respect to FIG. 9, a first UE (UE1) and other UEs (UE2 and UE3) are configured with a set of Init TX occasions and ReTX occasions. UE1 sends a TB to UE2 in an initial Tx Occasion and UE2 positively acknowledges receipt of the TB (as indicated in an ACK conveyed via a PSFCH).

In the example illustrated in call flow diagram 1100 of FIG. 11, UE1 sends a first indication to UE2 and/or UE3, indicating a probability that UE1 will not use one or more Tx/ReTX occasions, as illustrated at 1102. In some aspects, as illustrated at 1104, UE2/UE3 may use the (Re)TX occasions, based at least in part on this first indication.

For example, UE2/UE3 may decide whether it can use the (Re)TX occasions based on the indicated probability, UE2 data characteristics, QoS requirements, Packet Delay Budget (PDB) priority, and/or other considerations. In some aspects, UE2/UE3 may use the (Re)TX occasions based on certain (e.g., configured) rules. For example, in some aspects, UE2/UE3 may use the (Re)TX occasions only if it will be used for data with a high priority and only if the probability of UE1 using the resources is less than a threshold value (e.g., 40%).

As illustrated at 1106, UE1 may send a second indication to UE2 and/or UE3, indicating that UE1 will use the one or more Tx/ReTX occasions. As shown, UE2 and/or UE3 may refrain from using the (Re)TX occasions based on the second indication. In some aspects, the second indication may indicate a probability that UE1 will claim/use/reuse the one or more Tx/ReTX occasions, where claiming refers to the (re) use, intent to (re) use, or signaling of intent to (re) use the occasion. Full claiming may refer to a UE reusing the resource with 100% probability, whereas a probability of claiming or claiming/using with a certain probability may mean that the UE will (re) use the resources with certain probability.

According to certain aspects, a UE may indicate skipping or using/reusing probabilities of at least one or more CG occasions, and/or one or more CG retransmissions via SCI-1, SCI-2 or a dedicated PSSCH signal. In some aspects, the UE may indicate probabilities for one or more of skip, soft skip, or use. For example, in some cases, probabilities for skip and soft skip may be provided. In some cases, a probability, X %, for use may be provided for a soft skipping option. In some cases, the probability, X, may be given in RRC/MAC-CE or SCI per logical channel (LCH), LCH group (LCG), quality of service (QoS) and/or priority. In other cases, the probability (or probabilities) may be communicated between UEs when they do RRC, or per resource pool configuration.

In some aspects, SCI-1 or SCI-2 may be transmitted even if the occasion will be skipped and the UE may indicate a probability of utilizing the retransmission for transmission of the TB or utilization of other occasions, if this is a CG.

In some aspects, the network may not assign resources to any UEs, allowing mode 2 RA for such resources, which may allow the UE that originally owned the resources to retry.

In some aspects, a UE may reuse any of those occasions under certain conditions defined by wireless communication standards (e.g., 3GPP) or provided by configuration by a network entity or a controlling unit. In some cases, the rules may be that the UE may reuse the resource if data arrived with an exact same LCG, LCH, group of LCGs, PHY priority, QoS, or a combination thereof.

In some aspects, the indication may indicate a probability of "skipping/cancellation/utilization" or a probability of "soft skipping/using". In some cases, such probabilities may be a function of at least a MAC priority assigned with the resource, a PHY priority assigned to the resource, traffic information (e.g., related UE traffic, inter-packet arrival rate, arrival rate, priority, QoS, packet delay constraints, etc.), and/or a power saving mode at a network entity. For example, in some cases, if a network entity is not at high power, it may be less able to provide resources. In such cases, a UE may be unwilling to give away resources.

In some aspects, the probability can be used at other UEs and the NW to reuse the occasions with a certain probability as well. For example, resource usage may be contention-based. In other words, devices may still have to contend for resources, even when the resources are indicated as being available (with some probability) due to skipping.

In some aspects, a network entity or wireless communication standard may define rules of change of transmission parameters if the UE is to reuse. This may include, for example, change of transmission power, beams, MCS, TBS, etc. In some cases, the rules may be provided at resource pool levels.

In some aspects, a skipping indication and associated probabilities, configurations, and/or rules can be per resource pool or group of resource pools or for all resource pools. For example, a per resource pool configuration may be considered more flexible.

In some aspects, resources used for the skipping indication can be configured per resource pool, per grant or per configuration of grant.

In some aspects, a UE may send a reuse indication. In such cases, the reuse indication may be sent on physical sidelink feedback channel (PSFCH), SCI-1, SCI-2, new SCI, dedicated PSSCH, or multiplexed with a reference signal. In some aspects, a reuse indication may include one or more occasions and/or one or more of retransmission occasions and a probability of claiming or full claiming. In some aspects, a timeline may be configured to send such a reusing indication.

Figure 12:
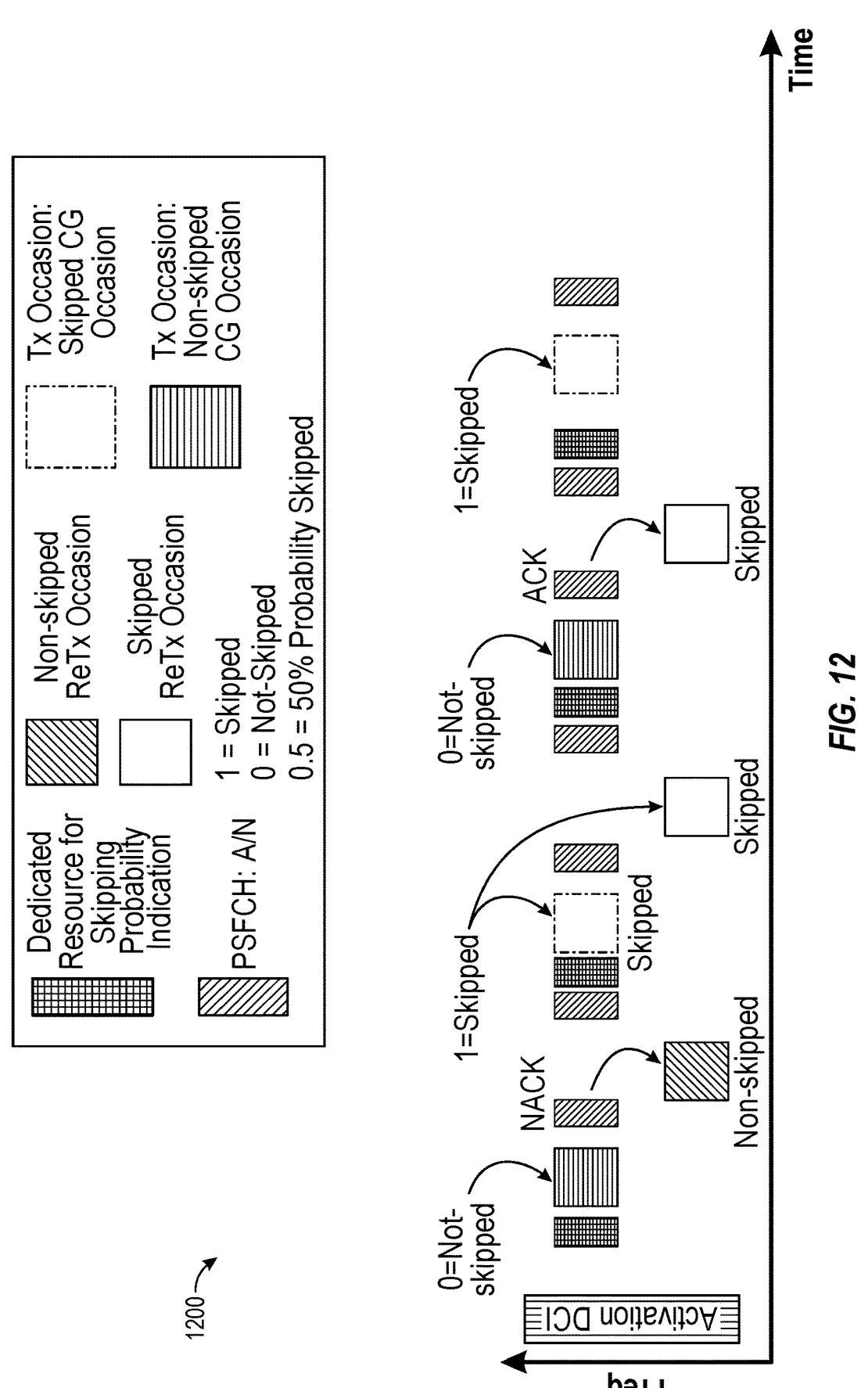
FIG. 12 depicts example sidelink CG transmission occasions with dedicated resources, according to various aspects described herein.

FIG. 12 depicts example sidelink CG transmission occasions with dedicated resources, according to various aspects described herein.

In some cases, certain resources may be dedicated for providing an indication of a probability of skipping Tx occasions. For example, as illustrated in FIG. 12, special dedicated resources may be configured (e.g., by a gNB) for each CG in order to provide this indication.

For the dedicated resources, the gNB can assign certain resources where each UE can indicate the status of using the next CG occasion. Similarly to the scenario described above with reference to FIG. 10, the resource size can be as small as one PRB where a TX-UE can send a 0 or 1 sequence-based encoding, which may be similar to PSFCH/PUCCH format 0. The resources may be overheard by all UEs participating in using the MU-MIMO, and the dedicated resources time/frequency location can be a function (or mapped based on) a corresponding CG index.

In the example illustrated in FIG. 12, the TX UE indicates, via the dedicated resource, that the first Init-TX CG Occasion has a certain probability of being skipped (e.g., 0% probability in this example, indicated by a 0 via sequence-based encoding). The TX UE also indicates, via the dedicated resource, that the second Init-TX CG Occasion (and corresponding ReTX Occasion) has a certain probability of being skipped (e.g., 100% probability in this example, by indicating a 1 via sequence-based encoding). In a similar manner, in the illustrated example, the TX UE also indicates that the third Init-TX CG Occasion has a 0% probability of being skipped (Skipping Indication=0) and that the fourth Init-TX CG Occasion has a 0% probability of being skipped (Skipping Indication=1). As illustrated, these techniques may also be applied for indicating various probabilities from 0% to 100% of an occasion being skipped (e.g., indicated by numbers between 0 and 1).

As noted above, the techniques described herein for exploiting skipped ReTx occasions may also be applied to scenarios where two Tx UEs transmit (to a receiver/RX UE)

on a common set of resources. This scenario may apply in the scenario of configured grant (CG) occasions, Mode 1 RA, and Mode 2 RA.

Example Operations

FIG. 13 shows an example of a method 1300 of wireless communications at a first user equipment (UE), such as a UE 104 of FIGS. 1 and 3.

Method 1300 begins at step 1305 with receiving sidelink configuration information configuring the first UE with at least initial transmission occasions for initial sidelink transmissions using shared sidelink resources. In some cases, the operations of this step refer to, or may be performed by, circuitry for receiving and/or code for receiving as described with reference to FIG. 15.

Method 1300 then proceeds to step 1310 with transmitting a first indication, to at least a second UE that uses the shared sidelink resources, of at least one probability that the first UE will skip at least one of the initial transmission occasions or one or more retransmission occasions scheduled for retransmission of an initial transmission. In some cases, the operations of this step refer to, or may be performed by, circuitry for transmitting and/or code for transmitting as described with reference to FIG. 15.

In some aspects, the method 1300 further includes transmitting a second indication that the first UE will not skip the at least one of the initial transmission occasions or the one or more retransmission occasions. In some cases, the operations of this step refer to, or may be performed by, circuitry for transmitting and/or code for transmitting as described with reference to FIG. 15.

In some aspects, the method 1300 further includes transmitting sidelink signaling, in accordance with the second indication, using the at least one of the initial transmission occasions or the one or more retransmission occasions. In some cases, the operations of this step refer to, or may be performed by, circuitry for transmitting and/or code for transmitting as described with reference to FIG. 15.

In some aspects, the method 1300 further includes changing one or more transmission parameters based on one or more rules. In some cases, the operations of this step refer to, or may be performed by, circuitry for changing and/or code for changing as described with reference to FIG. 15.

In some aspects, the one or more rules are defined by a network entity; and the one or more transmission parameters comprise at least one of transmission power, beams, modulation and coding scheme (MCS), or transport block size (TBS).

In some aspects, the method 1300 further includes deciding not to skip the at least one of the initial transmission occasions or the one or more retransmission occasions based on obtaining data having at least one of a same logical channel (LCH), a same LCH group (LCG), a same group of LCGs, a same quality of service (QoS) metric, or a same physical (PHY) layer priority. In some cases, the operations of this step refer to, or may be performed by, circuitry for deciding and/or code for deciding as described with reference to FIG. 15.

In some aspects, the second indication indicates: at least one of the initial transmission occasions or the one or more retransmission occasions; and at least one probability of claiming the at least one of the initial transmission occasions or the one or more retransmission occasions.

In some aspects, the second indication is sent within a configured time duration.

In some aspects, at least one of the first indication or the at least one probability is configured per resource pool or per resource pool group.

In some aspects, the at least one probability is based on at least one of: a medium access control (MAC) priority assigned with a resource; a physical (PHY) layer priority; traffic information; or power saving information at a network entity.

In some aspects, the at least one probability is used by at least one of a network entity or the at least the second UE to reuse the at least one of the initial transmission occasions or the one or more retransmission occasions.

In some aspects, the at least a second UE comprises at least one of: an intended recipient of a sidelink transmission on an initial transmission occasion or retransmission occasion the first UE indicated a probability it will skip; or a UE that transmits on the shared sidelink resources.

In some aspects, the first UE transmits the first indication after a corresponding initial transmission was acknowledged.

In some aspects, the first indication is transmitted via at least one of: sidelink control information (SCI), dedicated physical sidelink shared channel (PSSCH) signaling, radio resource control (RRC) signaling, a medium access control (MAC) control element (CE), or a reference signal.

In some aspects, the first UE transmits the first indication when the first UE lacks a transport block (TB) for that initial transmission occasion.

In some aspects, the first UE transmits the first indication when it is participating in higher communications on a link with a network entity or using a different set of sidelink resources.

Figure 15:
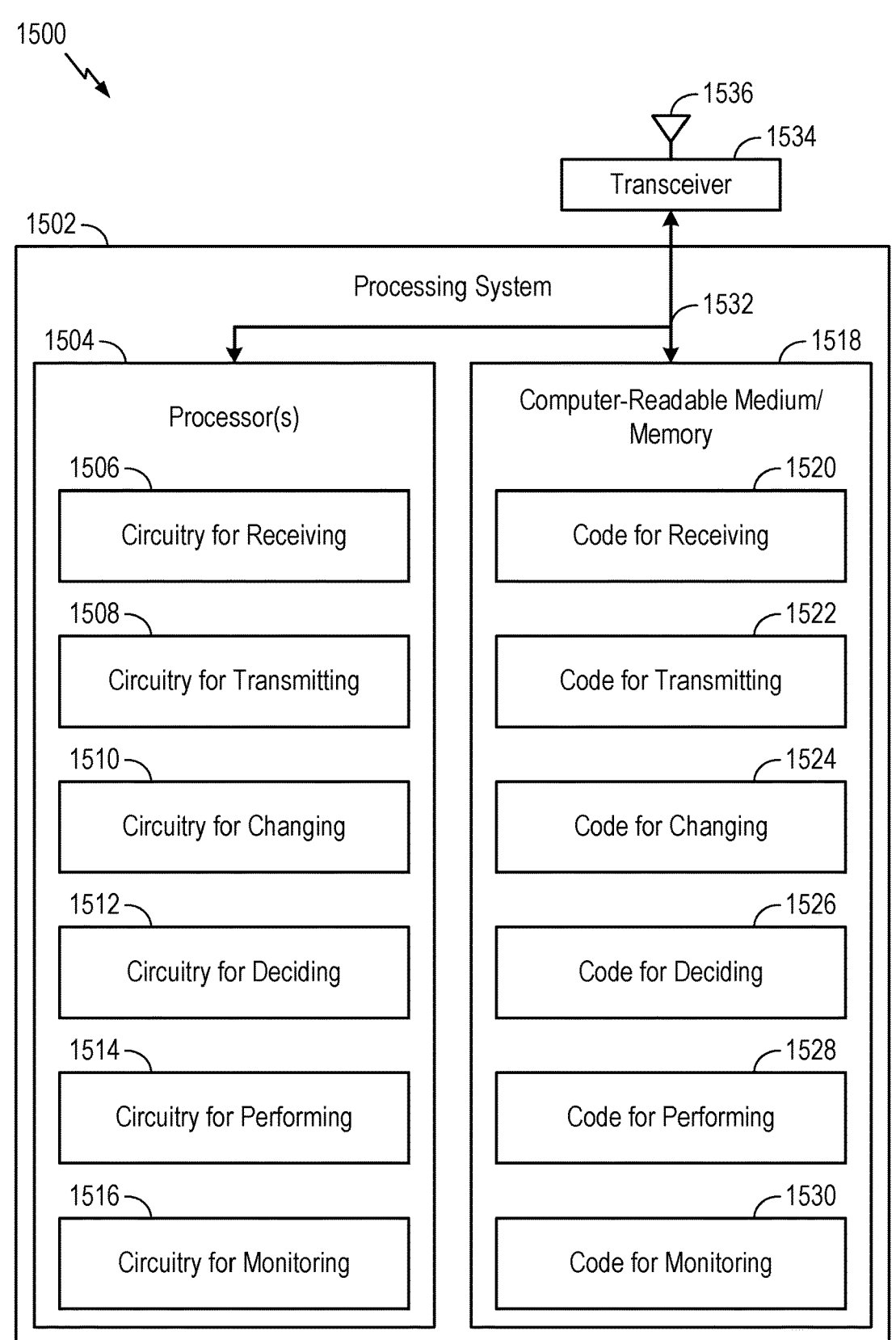
FIG. 15 depicts aspects of an example communications device.

In one aspect, method 1300, or any aspect related to it, may be performed by an apparatus, such as communications device 1500 of FIG. 15, which includes various components operable, configured, or adapted to perform the method 1300. Communications device 1500 is described below in further detail.

Note that FIG. 13 is just one example of a method, and other methods including fewer, additional, or alternative steps are possible consistent with this disclosure.

FIG. 14 shows an example of a method 1400 of wireless communications at a second user equipment (UE), such as a UE 104 of FIGS. 1 and 3.

Method 1400 begins at step 1405 with receiving a first indication of at least one probability that a first UE will skip at least one of initial transmission occasions for initial sidelink transmissions using shared sidelink resources or one or more retransmission occasions scheduled for retransmission of an initial transmission. In some cases, the operations of this step refer to, or may be performed by, circuitry for receiving and/or code for receiving as described with reference to FIG. 15.

Method 1400 then proceeds to step 1410 with performing one or more actions, based on the first indication, during the at least one of the initial transmission occasions or the one or more retransmission occasions. In some cases, the operations of this step refer to, or may be performed by, circuitry for performing and/or code for performing as described with reference to FIG. 15.

In some aspects, the performing the one or more actions comprises transmitting, using the shared sidelink resources, during the at least one of the initial transmission occasions or the one or more retransmission occasions.

In some aspects, the second indication is received within a configured time duration.

In some aspects, the method 1400 further includes monitoring for a second indication that the first UE will not skip the at least one of the initial transmission occasions or the one or more retransmission occasions 20. In some aspects, the method 1400 further includes receiving the second indication that the first UE will not skip the at least one of the initial transmission occasions or the one or more retransmission occasions. In some cases, the operations of this step refer to, or may be performed by, circuitry for monitoring and/or code for monitoring as described with reference to FIG. 15.

In some aspects, at least one of the first indication or the at least one probability is configured per resource pool or per resource pool group.

In some aspects, the at least one probability is based on at least one of: a medium access control (MAC) priority assigned with a resource; a physical (PHY) layer priority; traffic information; or power saving information at a network entity.

In some aspects, the second UE comprises at least one of: an intended recipient of a sidelink transmission on an initial transmission occasion or retransmission occasion that the first UE indicated a probability it will skip; or a UE that transmits on the shared sidelink resources.

In some aspects, the first indication is received via at least one of: sidelink control information (SCI), dedicated physical sidelink shared channel (PSSCH) signaling, radio resource control (RRC) signaling, a medium access control (MAC) control element (CE), or a reference signal.

In some aspects, the first indication is received when at least one of: the first UE lacks a transport block (TB) for that initial transmission occasion, the first UE is participating in higher communications on a link with a network entity, or the first UE is using a different set of sidelink resources.

In one aspect, method 1400, or any aspect related to it, may be performed by an apparatus, such as communications device 1500 of FIG. 15, which includes various components operable, configured, or adapted to perform the method 1400. Communications device 1500 is described below in further detail.

Note that FIG. 14 is just one example of a method, and other methods including fewer, additional, or alternative steps are possible consistent with this disclosure.

Example Communications Device(s)

FIG. 15 depicts aspects of an example communications device 1500. In some aspects, communications device 1500 is a user equipment, such as UE 104 described above with respect to FIGS. 1 and 3.

The communications device 1500 includes a processing system 1505 coupled to the transceiver 1585 (e.g., a transmitter and/or a receiver). The transceiver 1585 is configured to transmit and receive signals for the communications device 1500 via the antenna 1590, such as the various signals as described herein. The processing system 1505 may be configured to perform processing functions for the communications device 1500, including processing signals received and/or to be transmitted by the communications device 1500.

The processing system 1505 includes one or more processors 1510. In various aspects, the one or more processors 1510 may be representative of one or more of receive processor 358, transmit processor 364, TX MIMO processor 366, and/or controller/processor 380, as described with respect to FIG. 3. The one or more processors 1510 are coupled to a computer-readable medium/memory 1545 via a bus 1580. In certain aspects, the computer-readable medium/memory 1545 is configured to store instructions (e.g., computer-executable code) that when executed by the one or more processors 1510, cause the one or more processors 1510 to perform the method 1300 described with respect to FIG. 13, or any aspect related to it; and the method 1400 described with respect to FIG. 14, or any aspect related to it. Note that reference to a processor performing a function of communications device 1500 may include one or more processors 1510 performing that function of communications device 1500.

In the depicted example, computer-readable medium/memory 1545 stores code (e.g., executable instructions), such as code for receiving 1550, code for transmitting 1555, code for changing 1560, code for deciding 1565, code for performing 1570, and code for monitoring 1575. Processing of the code for receiving 1550, code for transmitting 1555, code for changing 1560, code for deciding 1565, code for performing 1570, and code for monitoring 1575 may cause the communications device 1500 to perform the method 1300 described with respect to FIG. 13, or any aspect related to it; and the method 1400 described with respect to FIG. 14, or any aspect related to it.

The one or more processors 1510 include circuitry configured to implement (e.g., execute) the code stored in the computer-readable medium/memory 1545, including circuitry such as circuitry for receiving 1515, circuitry for transmitting 1520, circuitry for changing 1525, circuitry for deciding 1530, circuitry for performing 1535, and circuitry for monitoring 1540. Processing with circuitry for receiving 1515, circuitry for transmitting 1520, circuitry for changing 1525, circuitry for deciding 1530, circuitry for performing 1535, and circuitry for monitoring 1540 may cause the communications device 1500 to perform the method 1300 described with respect to FIG. 13, or any aspect related to it; and the method 1400 described with respect to FIG. 14, or any aspect related to it.

Various components of the communications device 1500 may provide means for performing the method 1300 described with respect to FIG. 13, or any aspect related to it; and the method 1400 described with respect to FIG. 14, or any aspect related to it. For example, means for transmitting, sending or outputting for transmission may include transceivers 354 and/or antenna(s) 352 of the UE 104 illustrated in FIG. 3 and/or the transceiver 1585 and the antenna 1590 of the communications device 1500 in FIG. 15. Means for receiving or obtaining may include transceivers 354 and/or antenna(s) 352 of the UE 104 illustrated in FIG. 3 and/or the transceiver 1585 and the antenna 1590 of the communications device 1500 in FIG. 15.

Example Clauses

Implementation examples are described in the following numbered clauses:

Clause 1: A method for wireless communications at a first user equipment (UE), comprising: receiving sidelink configuration information configuring the first UE with at least initial transmission occasions for initial sidelink transmissions using shared sidelink resources; and transmitting a first indication, to at least a second UE that uses the shared sidelink resources, of at least one probability that the first UE will skip at least one of the initial transmission occasions or one or more retransmission occasions scheduled for retransmission of an initial transmission.

Clause 2: The method of Clause 1, further comprising transmitting a second indication that the first UE will not skip the at least one of the initial transmission occasions or the one or more retransmission occasions.

Clause 3: The method of Clause 2, further comprising transmitting sidelink signaling, in accordance with the second indication, using the at least one of the initial transmission occasions or the one or more retransmission occasions.

Clause 4: The method of Clause 3, further comprising changing one or more transmission parameters based on one or more rules.

Clause 5: The method of Clause 4, wherein: the one or more rules are defined by a network entity; and the one or more transmission parameters comprise at least one of transmission power, beams, modulation and coding scheme (MCS), or transport block size (TBS).

Clause 6: The method of Clause 2, further comprising deciding not to skip the at least one of the initial transmission occasions or the one or more retransmission occasions based on obtaining data having at least one of a same logical channel (LCH), a same LCH group (LCG), a same group of LCGs, a same quality of service (QoS) metric, or a same physical (PHY) layer priority.

Clause 7: The method of Clause 2, wherein the second indication indicates: at least one of the initial transmission occasions or the one or more retransmission occasions; and at least one probability of claiming the at least one of the initial transmission occasions or the one or more retransmission occasions.

Clause 8: The method of Clause 2, wherein the second indication is sent within a configured time duration.

Clause 9: The method of any one of Clauses 1-8, wherein at least one of the first indication or the at least one probability is configured per resource pool or per resource pool group.

Clause 10: The method of any one of Clauses 1-9, wherein the at least one probability is based on at least one of: a medium access control (MAC) priority assigned with a resource; a physical (PHY) layer priority; traffic information; or power saving information at a network entity.

Clause 11: The method of any one of Clauses 1-10, wherein the at least one probability is used by at least one of a network entity or the at least the second UE to reuse the at least one of the initial transmission occasions or the one or more retransmission occasions.

Clause 12: The method of any one of Clauses 1-11, wherein the at least a second UE comprises at least one of: an intended recipient of a sidelink transmission on an initial transmission occasion or retransmission occasion the first UE indicated a probability it will skip; or a UE that transmits on the shared sidelink resources.

Clause 13: The method of any one of Clauses 1-12, wherein the first UE transmits the first indication after a corresponding initial transmission was acknowledged.

Clause 14: The method of any one of Clauses 1-13, wherein the first indication is transmitted via at least one of: sidelink control information (SCI), dedicated physical sidelink shared channel (PSSCH) signaling, radio resource control (RRC) signaling, a medium access control (MAC) control element (CE), or a reference signal.

Clause 15: The method of any one of Clauses 1-14, wherein the first UE transmits the first indication when the first UE lacks a transport block (TB) for that initial transmission occasion.

Clause 16: The method of any one of Clauses 1-15, wherein the first UE transmits the first indication when it is participating in higher communications on a link with a network entity or using a different set of sidelink resources.

Clause 17: A method for wireless communications at a second user equipment (UE), comprising: receiving a first indication of at least one probability that a first UE will skip at least one of initial transmission occasions for initial sidelink transmissions using shared sidelink resources or one or more retransmission occasions scheduled for retransmission of an initial transmission; and performing one or more actions, based on the first indication, during the at least one of the initial transmission occasions or the one or more retransmission occasions.

Clause 18: The method of Clause 17, wherein the performing the one or more actions comprises transmitting, using the shared sidelink resources, during the at least one of the initial transmission occasions or the one or more retransmission occasions.

Clause 19: The method of any one of Clauses 17-18, further comprising monitoring for a second indication that the first UE will not skip the at least one of the initial transmission occasions or the one or more retransmission occasions 20. The method of claim 19, further comprising receiving the second indication that the first UE will not skip the at least one of the initial transmission occasions or the one or more retransmission occasions.

Clause 20: The method of Clause 19, further comprising receiving the second indication that the first UE will not skip the at least one of the initial transmission occasions or the one or more retransmission occasions.

Clause 21: The method of Clause 20, wherein the performing the one or more actions comprises refraining from transmitting, using the shared sidelink resources, during the at least one of the initial transmission occasions or the one or more retransmission occasions.

Clause 22: The method of Clause 18, wherein the second indication is received within a configured time duration.

Clause 23: The method of any one of Clauses 17-22, wherein at least one of the first indication or the at least one probability is configured per resource pool or per resource pool group.

Clause 24: The method of any one of Clauses 17-23, wherein the at least one probability is based on at least one of: a medium access control (MAC) priority assigned with a resource; a physical (PHY) layer priority; traffic information; or power saving information at a network entity.

Clause 25: The method of any one of Clauses 17-24, wherein the second UE comprises at least one of: an intended recipient of a sidelink transmission on an initial transmission occasion or retransmission occasion that the first UE indicated a probability it will skip; or a UE that transmits on the shared sidelink resources.

Clause 26: The method of any one of Clauses 17-25, wherein the first indication is received via at least one of: sidelink control information (SCI), dedicated physical sidelink shared channel (PSSCH) signaling, radio resource control (RRC) signaling, a medium access control (MAC) control element (CE), or a reference signal.

Clause 27: The method of any one of Clauses 17-26, wherein the first indication is received when at least one of: the first UE lacks a transport block (TB) for that initial transmission occasion, the first UE is participating in higher communications on a link with a network entity, or the first UE is using a different set of sidelink resources.

Clause 28: An apparatus, comprising: a memory comprising executable instructions; and a processor configured to execute the executable instructions and cause the apparatus to perform a method in accordance with any one of Clauses 1-27.

Clause 29: An apparatus, comprising means for performing a method in accordance with any one of Clauses 1-27.

Clause 30: A non-transitory computer-readable medium comprising executable instructions that, when executed by a processor of an apparatus, cause the apparatus to perform a method in accordance with any one of Clauses 1-27.

Clause 31: A computer program product embodied on a computer-readable storage medium comprising code for performing a method in accordance with any one of Clauses 1-27.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:
1. An apparatus for wireless communication at a first user equipment (UE), comprising: a memory comprising com- puter-executable instructions; and one or more processors configured to execute the computer-executable instructions and cause the apparatus to:

receive sidelink configuration information configuring the first UE with at least initial transmission occasions for initial sidelink transmissions using shared sidelink resources;

transmit a first indication, to at least a second UE that uses the shared sidelink resources, of at least one probability that the first UE will skip at least one of the initial transmission occasions or one or more retransmission occasions scheduled for retransmission of an initial transmission; and transmit a second indication that the first UE will not skip the at least one of the initial transmission occasions or the one or more retransmission occasions, wherein the second indication indicates: at least one of the initial transmission occasions or the one or more retransmission occasions; and at least one probability of claiming the at least one of the initial transmission occasions or the one or more retransmission occasions.

2. The apparatus of claim 1, wherein the one or more processors are further configured to execute the computer-executable instructions and cause the apparatus to:

transmit sidelink signaling, in accordance with the second indication, using the at least one of the initial transmission occasions or the one or more retransmission occasions.

3. The apparatus of claim 2, wherein the one or more processors are further configured to execute the computer-executable instructions and cause the apparatus to:

change one or more transmission parameters based on one or more rules.

4. The apparatus of claim 3, wherein: the one or more rules are defined by a network entity; and the one or more transmission parameters comprise at least one of transmission power, beams, modulation and coding scheme (MCS), or transport block size (TBS).

5. The apparatus of claim 1, wherein the one or more processors are further configured to execute the computer-executable instructions and cause the apparatus to:

decide not to skip the at least one of the initial transmission occasions or the one or more retransmission occasions based on obtaining data having at least one of a same logical channel (LCH), a same LCH group (LCG), a same group of LCGs, a same quality of service (QoS) metric, or a same physical (PHY) layer priority.

6. The apparatus of claim 1, wherein the second indication is sent within a configured time duration.

7. The apparatus of claim 1, wherein at least one of the first indication or the at least one probability is configured per resource pool or per resource pool group.

8. The apparatus of claim 1, wherein the at least one probability is based on at least one of: a medium access control (MAC) priority assigned with a resource; a physical (PHY) layer priority; traffic information; or power saving information at a network entity.

9. The apparatus of claim 1, wherein the at least one probability is used by at least one of a network entity or the at least the second UE to reuse the at least one of the initial transmission occasions or the one or more retransmission occasions.

10. The apparatus of claim 1, wherein the at least a second UE comprises at least one of: an intended recipient of a sidelink transmission on an initial transmission occasion or retransmission occasion the first UE indicated a probability it will skip; or a UE that transmits on the shared sidelink resources.

11. The apparatus of claim 1, wherein the first UE transmits the first indication after a corresponding initial transmission was acknowledged.

12. The apparatus of claim 1, wherein the first indication is transmitted via at least one of: sidelink control information (SCI), dedicated physical sidelink shared channel (PSSCH) signaling, radio resource control (RRC) signaling, a medium access control (MAC) control element (CE), or a reference signal.

13. The apparatus of claim 1, wherein the first UE transmits the first indication when the first UE lacks a transport block (TB) for that initial transmission occasion.

14. The apparatus of claim 1, wherein the first UE transmits the first indication when it is participating in higher communications on a link with a network entity or using a different set of sidelink resources.

15. An apparatus for wireless communication at a second user equipment (UE), comprising: a memory comprising computer-executable instructions; and one or more processors configured to execute the computer-executable instructions and cause the apparatus to:

receive a first indication of at least one probability that a first UE will skip at least one of initial transmission occasions for initial sidelink transmissions using shared sidelink resources or one or more retransmission occasions scheduled for retransmission of an initial transmission;

perform one or more actions, based on the first indication, during the at least one of the initial transmission occasions or the one or more retransmission occasions;

monitor for a second indication that the first UE will not skip the at least one of the initial transmission occasions or the one or more retransmission occasions; and receive the second indication that the first UE will not skip the at least one of the initial transmission occasions or the one or more retransmission occasions, wherein the second indication indicates:

at least one of the initial transmission occasions or the one or more retransmission occasions; and at least one probability of claiming the at least one of the initial transmission occasions or the one or more retransmission occasions.

16. The apparatus of claim 15, wherein the performing the one or more actions comprises transmitting, using the shared sidelink resources, during the at least one of the initial transmission occasions or the one or more retransmission occasions.

17. The apparatus of claim 15, wherein the performing the one or more actions comprises refraining from transmitting, using the shared sidelink resources, during the at least one of the initial transmission occasions or the one or more retransmission occasions.

18. The apparatus of claim 15, wherein the second indication is received within a configured time duration.

19. The apparatus of claim 15, wherein at least one of the first indication or the at least one probability is configured per resource pool or per resource pool group.

20. The apparatus of claim 15, wherein the at least one probability is based on at least one of:

a medium access control (MAC) priority assigned with a resource;

a physical (PHY) layer priority;

traffic information; or power saving information at a network entity.

21. The apparatus of claim 15, wherein the second UE comprises at least one of:

an intended recipient of a sidelink transmission on an initial transmission occasion or retransmission occasion that the first UE indicated a probability it will skip; or a UE that transmits on the shared sidelink resources.

22. The apparatus of claim 15, wherein the first indication is received via at least one of: sidelink control information (SCI), dedicated physical sidelink shared channel (PSSCH) signaling, radio resource control (RRC) signaling, a medium access control (MAC) control element (CE), or a reference signal.

23. A method for wireless communications at a first user equipment (UE), comprising:

receiving sidelink configuration information configuring the first UE with at least initial transmission occasions for initial sidelink transmissions using shared sidelink resources;

transmitting a first indication, to at least a second UE that uses the shared sidelink resources, of at least one probability that the first UE will skip at least one of the initial transmission occasions or one or more retransmission occasions scheduled for retransmission of an initial transmission; and transmitting a second indication that the first UE will not skip the at least one of the initial transmission occasions or the one or more retransmission occasions, wherein the second indication indicates: at least one of the initial transmission occasions or the one or more retransmission occasions; and at least one probability of claiming the at least one of the initial transmission occasions or the one or more retransmission occasions.

24. A method for wireless communications at a second user equipment (UE), comprising:

receiving a first indication of at least one probability that a first UE will skip at least one of initial transmission occasions for initial sidelink transmissions using shared sidelink resources or one or more retransmission occasions scheduled for retransmission of an initial transmission;

performing one or more actions, based on the first indication, during the at least one of the initial transmission occasions or the one or more retransmission occasions;

monitoring for a second indication that the first UE will not skip the at least one of the initial transmission occasions or the one or more retransmission occasions; and receiving the second indication that the first UE will not skip the at least one of the initial transmission occasions or the one or more retransmission occasions, wherein the second indication indicates:

at least one of the initial transmission occasions or the one or more retransmission occasions; and at least one probability of claiming the at least one of the initial transmission occasions or the one or more retransmission occasions.

* * * * *